US012109813B2

(12) United States Patent
Takabe

(10) Patent No.: US 12,109,813 B2
(45) Date of Patent: Oct. 8, 2024

(54) LIQUID EJECTING HEAD AND LIQUID EJECTING APPARATUS

(71) Applicant: SEIKO EPSON CORPORATION, Tokyo (JP)

(72) Inventor: Motoki Takabe, Shiojiri (JP)

(73) Assignee: Seiko Epson Corporation, Tokyo (JP)

(*) Notice: Subject to any disclaimer, the term of this patent is extended or adjusted under 35 U.S.C. 154(b) by 131 days.

(21) Appl. No.: 18/060,691

(22) Filed: Dec. 1, 2022

(65) Prior Publication Data

US 2023/0173808 A1 Jun. 8, 2023

(30) Foreign Application Priority Data

Dec. 3, 2021 (JP) ................................ 2021-196716

(51) Int. Cl.
*B41J 2/14* (2006.01)

(52) U.S. Cl.
CPC ....... *B41J 2/14201* (2013.01); *B41J 2/14233* (2013.01); *B41J 2002/14241* (2013.01); *B41J 2002/14362* (2013.01); *B41J 2002/14419* (2013.01); *B41J 2002/14491* (2013.01)

(58) Field of Classification Search
CPC .......... B41J 2/14201; B41J 2002/14241; B41J 2002/14362; B41J 2002/14419; B41J 2002/14491; B41J 2/14233
See application file for complete search history.

(56) References Cited

U.S. PATENT DOCUMENTS

2006/0209141 A1* 9/2006 Kojima .................... B41J 2/161 347/85
2014/0267504 A1* 9/2014 Ohashi ................. B41J 2/14233 347/68

FOREIGN PATENT DOCUMENTS

EP 3069879 A1 * 9/2016 ................ B41J 2/14
JP 2011126257 A * 6/2011 .............. B41J 2/045
JP 2021-003827 A 1/2021

* cited by examiner

*Primary Examiner* — Yaovi M Ameh
(74) *Attorney, Agent, or Firm* — WORKMAN NYDEGGER

(57) ABSTRACT

A liquid ejecting head includes: a sealing substrate provided in such a way as to cover the first piezoelectric element and the second piezoelectric element; a wiring board configured to apply a voltage to a common electrode, a first individual electrode, and a second individual electrode; a first wiring portion provided above the pressure chamber substrate and configured to electrically couple the common electrode to the wiring board; a second wiring portion provided at a lower surface of the sealing substrate and configured to electrically couple the common electrode to the wiring board; and a third wiring portion provided between the first piezoelectric element and the second piezoelectric element and configured to electrically couple the first wiring portion to the second wiring portion.

14 Claims, 14 Drawing Sheets

LIQUID EJECTING HEAD AND LIQUID EJECTING APPARATUS

The present application is based on, and claims priority from JP Application Serial Number 2021-196716, filed Dec. 3, 2021, the disclosure of which is hereby incorporated by reference herein in its entirety.

BACKGROUND

1. Technical Field

The present disclosure relates to a liquid ejecting head and a liquid ejecting apparatus.

2. Related Art

A liquid ejecting head described in JP-A-2021-3827 includes nozzles that eject a liquid, pressure chambers that communicate with the nozzles, and piezoelectric elements that provide the liquid in the piezoelectric elements with pressure variations. The piezoelectric elements include individual electrodes provided to the respective pressure chambers, a common electrode provided to the individual electrodes in common, and piezoelectric bodies each disposed between the corresponding individual electrode and the common electrode. The liquid ejecting head also includes a wiring board for supplying voltages to the individual electrodes and the common electrode.

The liquid ejecting head includes wiring that electrically couples the common electrode to the wiring board. According to the liquid ejecting head of the related art, the wiring that electrically couples the common electrode to the wiring board is provided above a pressure chamber substrate in which the pressure chambers are formed. The liquid ejecting head of the related art has a problem of large resistance of the wiring that is coupled to the common electrode.

SUMMARY

A liquid ejecting head according to an aspect of the present disclosure includes: a nozzle substrate including a first nozzle configured to eject a liquid and a second nozzle provided at a position adjacent to the first nozzle and configured to eject a liquid; a pressure chamber substrate provided above the nozzle substrate and including a first pressure chamber that communicates with the first nozzle and a second pressure chamber that communicates with the second nozzle; a first piezoelectric element formed from a common electrode, a first piezoelectric body, and a first individual electrode and configured to apply a pressure to a liquid in the first pressure chamber; a second piezoelectric element formed from the common electrode, a second piezoelectric body, and a second individual electrode and configured to apply a pressure to a liquid in the second pressure chamber; a sealing substrate provided above the pressure chamber substrate in such a way as to cover the first piezoelectric element and the second piezoelectric element; a wiring board configured to apply a voltage to the common electrode, the first individual electrode, and the second individual electrode; a first wiring portion provided above the pressure chamber substrate and configured to electrically couple the common electrode to the wiring board; a second wiring portion provided at a lower surface of the sealing substrate and configured to electrically couple the common electrode to the wiring board; and a third wiring portion provided between the first piezoelectric element and the second piezoelectric element and configured to electrically couple the first wiring portion to the second wiring portion.

A liquid ejecting apparatus of the present disclosure includes the liquid ejecting head and a control unit that controls an operation of ejection from the liquid ejecting head.

DESCRIPTION OF EXEMPLARY EMBODIMENTS

Figure 1:
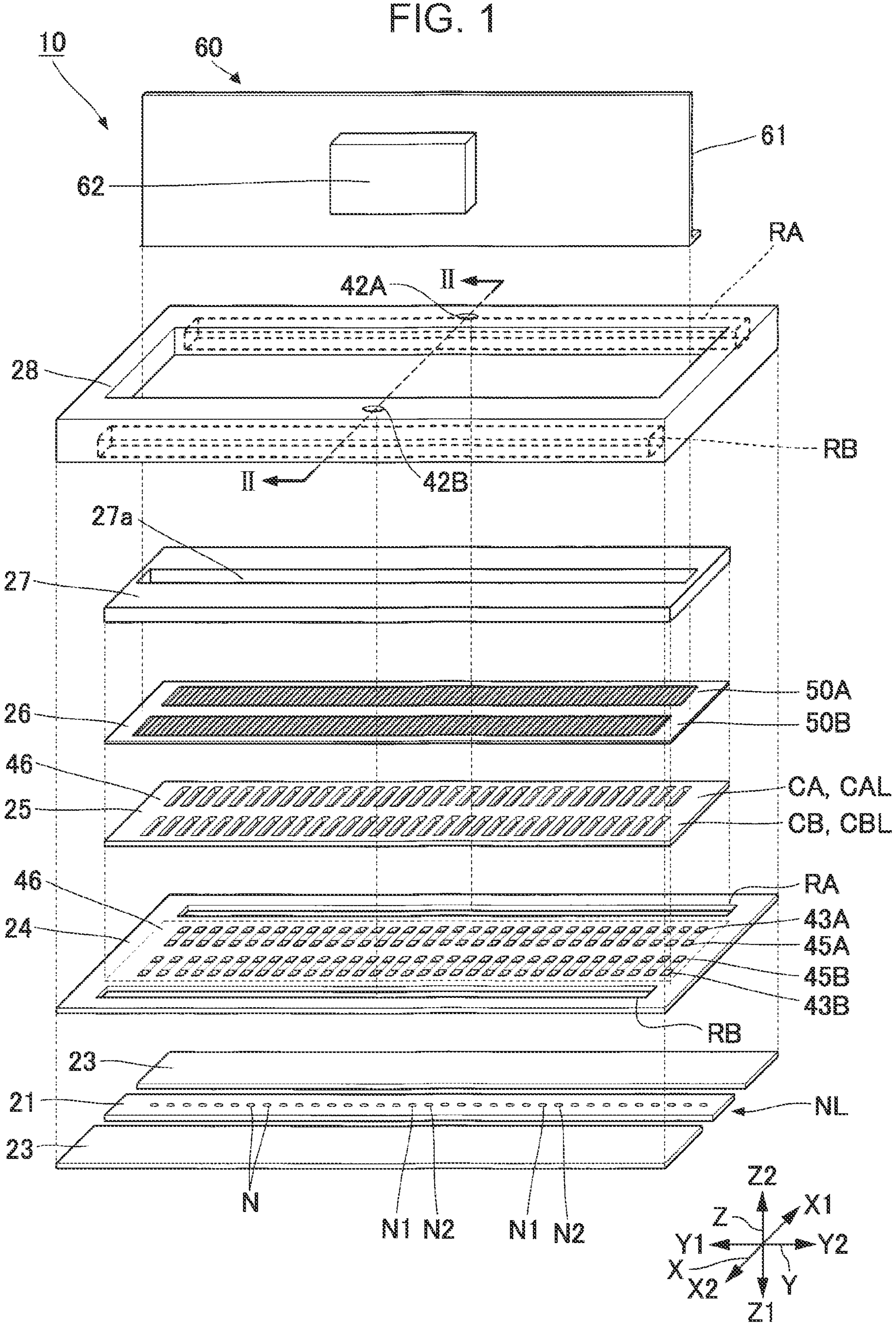
FIG. 1 is an exploded perspective view illustrating a liquid ejecting head according to Embodiment 1.

Modes for carrying out the present disclosure will be described below with reference to the drawings. It is to be noted, however, that dimensions and scales of components in the drawings are different from those of actual components as needed. The embodiments described below represent specific preferred examples and are therefore provided with various desirable limitations. The scope of the present disclosure is, however, not limited to these embodiments unless the following description expressly states the specific limitations of the present disclosure.

In the following description, three directions intersecting one another may be explained as x-axis direction, y-axis direction, and z-axis direction. The x-axis direction includes x1 direction and x2 direction which are mutually opposite directions. The y-axis direction includes y1 direction and y2 direction which are mutually opposite directions. The z-axis direction includes z1 direction and z2 direction which are mutually opposite directions. The x-axis direction, the y-axis direction, and the z-axis direction are orthogonal to one another. The "z1 direction" may be described as a "lower side" or "below" and the "z2 direction" may be described as an "upper side" or "above".

Embodiment 1

Figure 2:
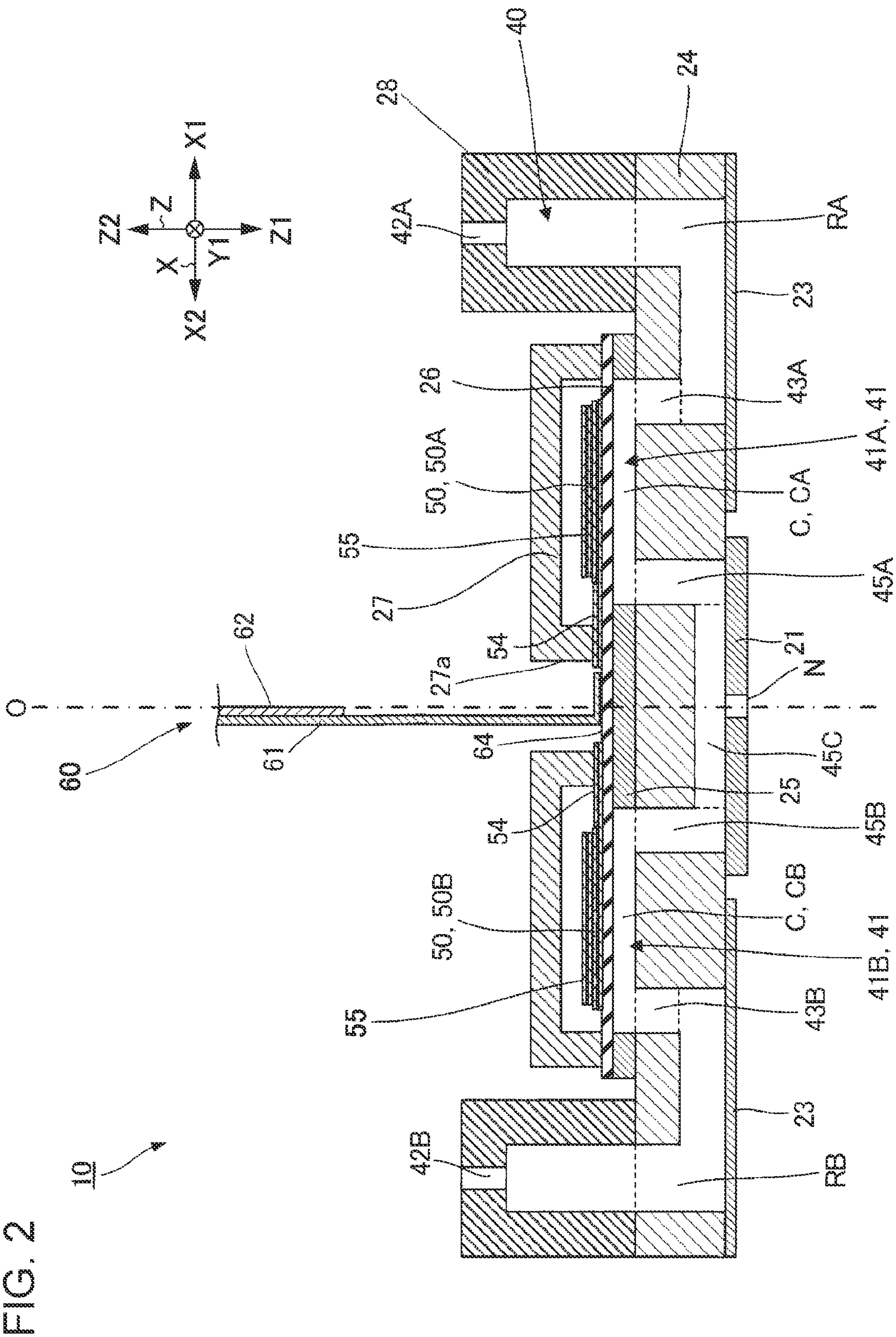
FIG. 2 is a sectional view illustrating a cross-section taken along line II-II in FIG. 1.
Figure 3:
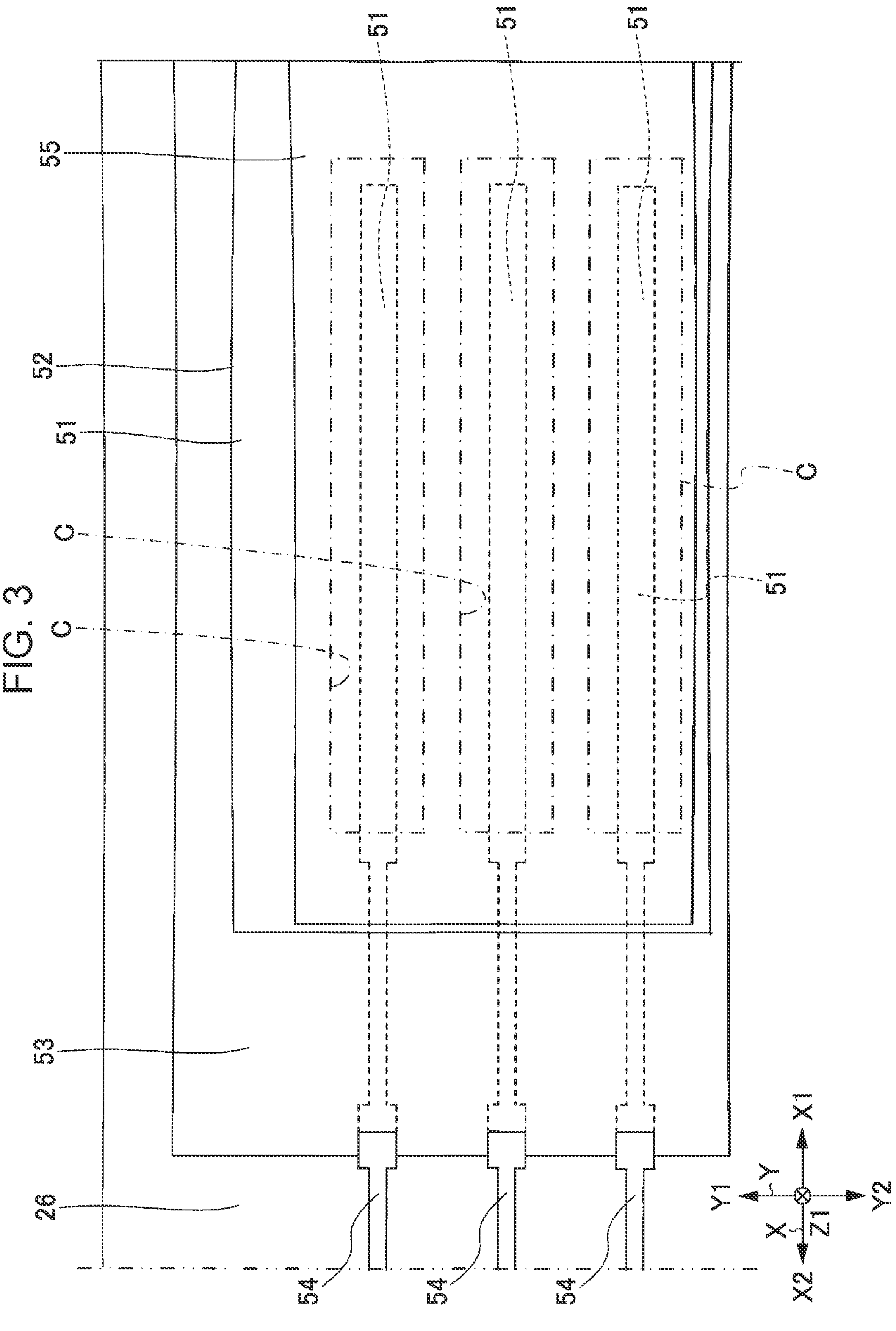
FIG. 3 is a plan view illustrating individual electrodes, a common electrode, COM lines, and a VBS line disposed above a pressure chamber substrate.

A liquid ejecting head 10 according to Embodiment 1 will be described with reference to FIGS. 1 to 7. FIG. 1 is an exploded perspective view illustrating the liquid ejecting head 10 according to the Embodiment 1. FIG. 2 is a sectional view illustrating a cross-section taken along line II-II in FIG. 1. FIG. 3 is a plan view illustrating individual electrodes 51, a common electrode 52, COM lines 54, and a VBS line 55 disposed above a pressure chamber substrate 25. The liquid ejecting head 10 adopts a circulation system that circulates liquids flowing in common liquid chambers RA and RB and pressure chambers CA and CB.

As illustrated in FIG. 1, the liquid ejecting head 10 includes a line of pressure chambers CAL and a line of pressure chambers CBL. The line of pressure chambers CAL includes the pressure chambers CA arranged in the y-axis direction. The line of pressure chambers CBL includes the pressure chambers CB arranged in the y-axis direction. The line of pressure chambers CAL and the line of pressure chambers CBL are located away from each other in the x-axis direction. The "pressure chamber CA" or the "pressure chamber CB" may be referred to as a "pressure chamber C" when the "pressure chamber CA" and the "pressure chamber CB" need not be distinguished from each other. The "line of pressure chambers CAL" or the "line of pressure chambers CBL" may be referred to as a line of pressure chambers CL when the "line of pressure chambers CAL" and the "line of pressure chambers CBL" need not be distinguished from each other. The line of pressure chambers CL includes the pressure chambers C arranged in the y-axis direction.

As illustrated in FIGS. 1 and 2, the liquid ejecting head 10 includes a nozzle substrate 21, compliance substrates 23, a communication plate 24, a pressure chamber substrate 25, a vibration plate 26, a sealing plate 27, and piezoelectric elements 50A and 50B. The liquid ejecting head 10 includes a casing 28 and a COF 60. The COF stands for chip on film. The present embodiment will describe the liquid ejecting head 10 that ejects an ink representing an example of a liquid. However, the liquid is not limited to the ink, and the liquid ejecting head 10 can eject other liquids. The "piezoelectric element 50A" and the "piezoelectric element 50B" may collectively be referred to as the "piezoelectric elements 50" when the "piezoelectric element 50A" and the "piezoelectric element 50B" need not be distinguished from each other.

Figure 4:
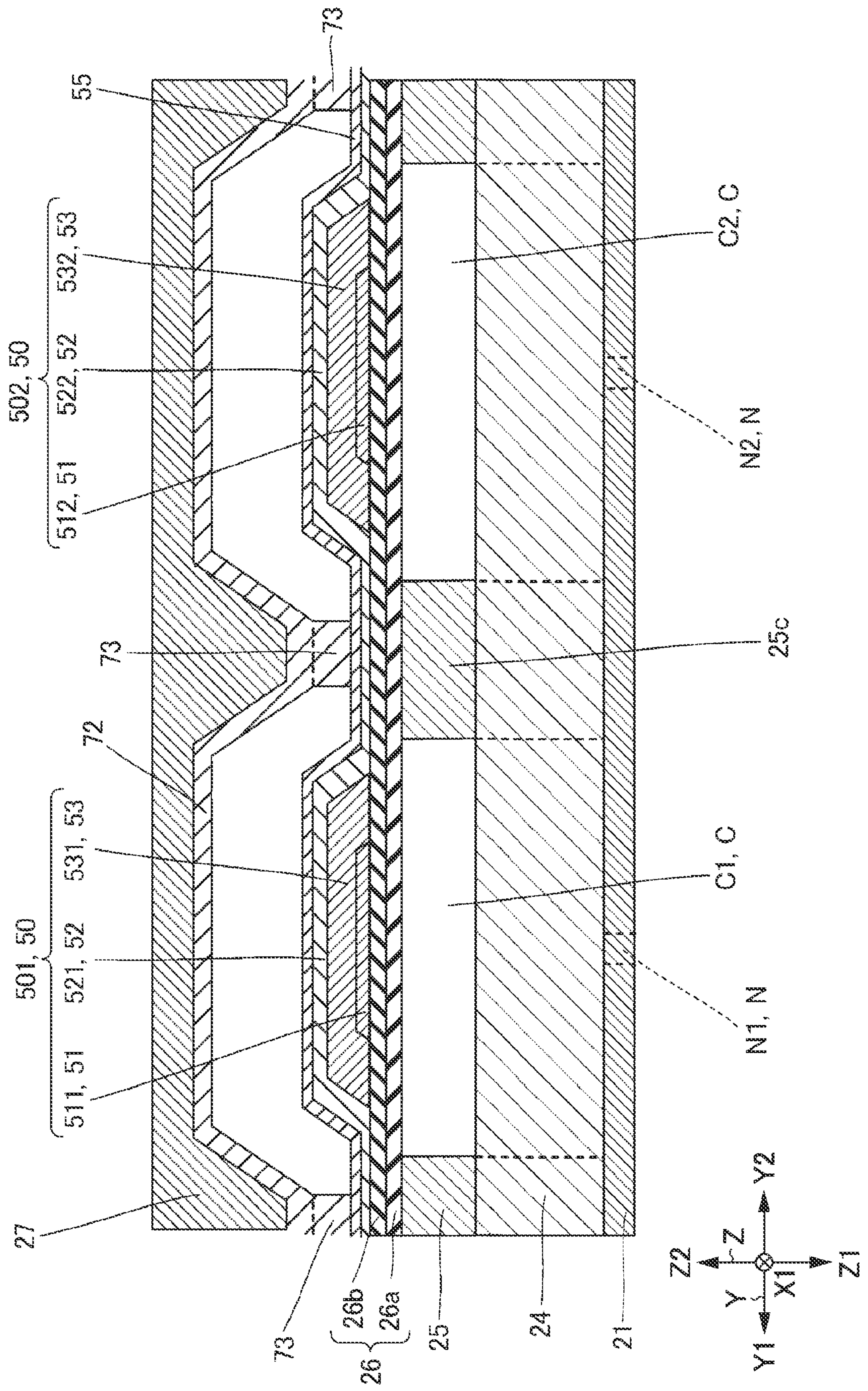
FIG. 4 is a sectional view illustrating a cross-section of the liquid ejecting head taken along YZ plane.
Figure 5:
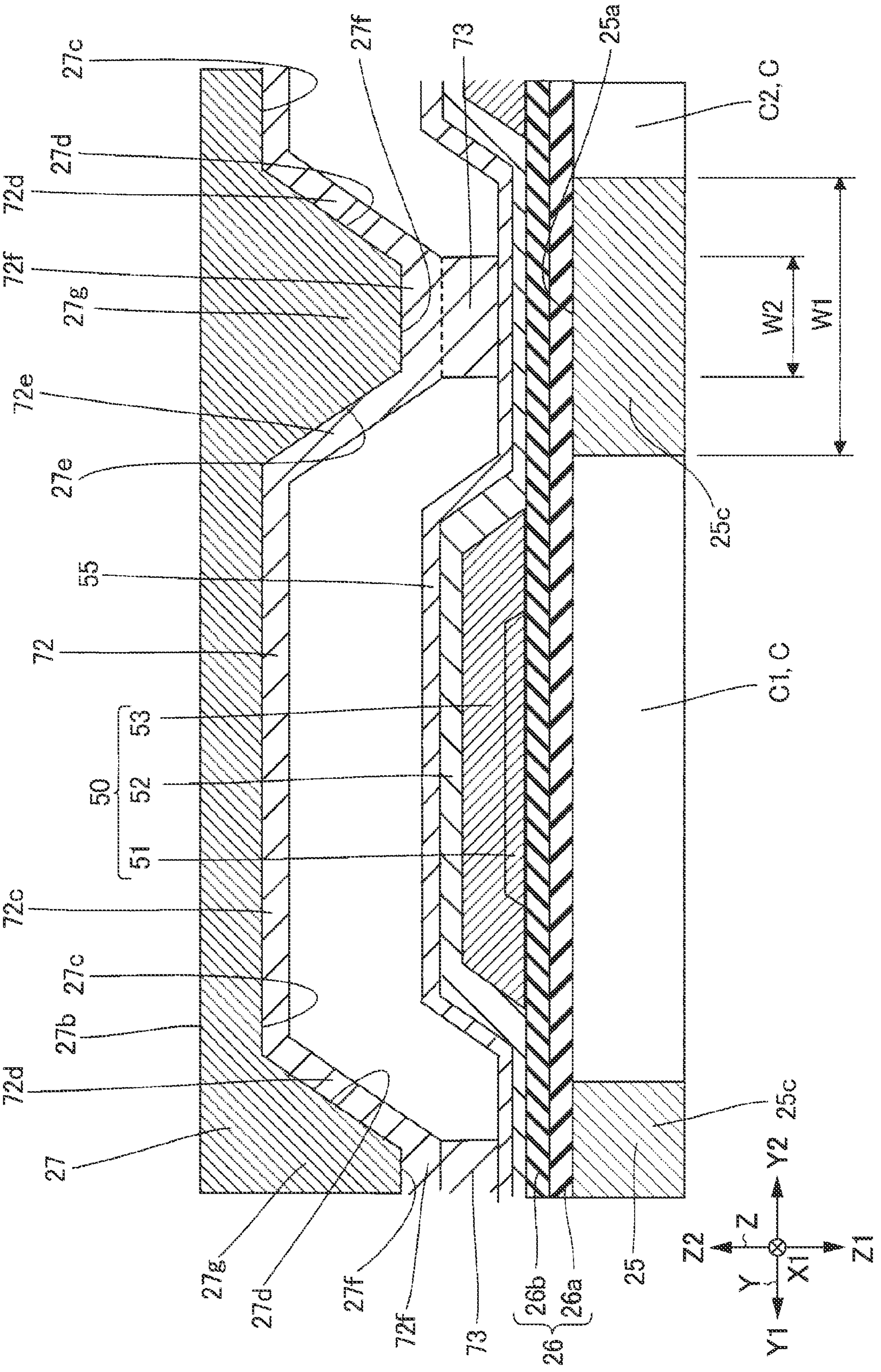
FIG. 5 is an enlarged sectional view illustrating the cross-section of the liquid ejecting head taken along the YZ plane.
Figure 7:
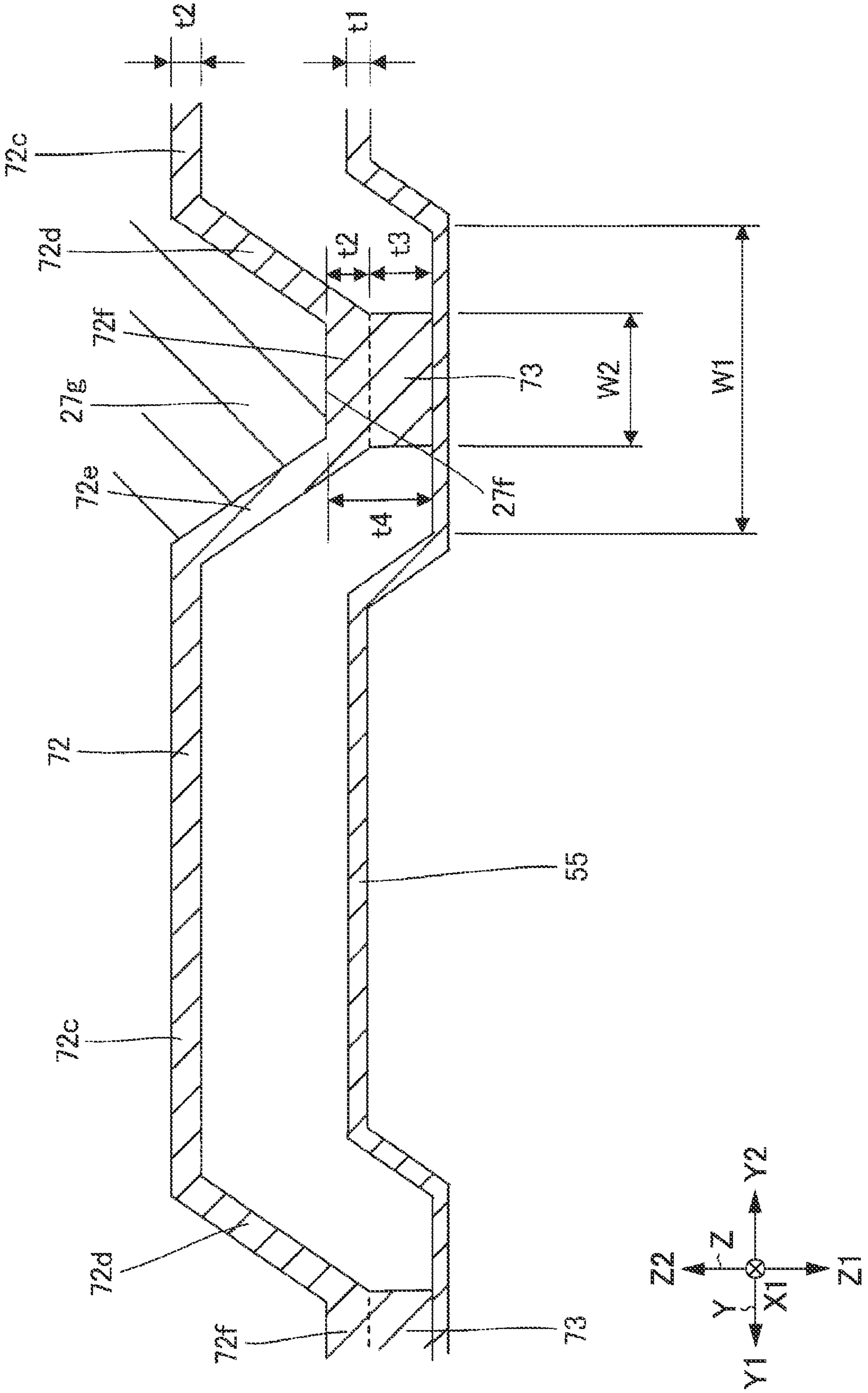
FIG. 7 is a sectional view illustrating the VBS line, and wiring portions that are provided below a sealing plate.

A thickness direction of each of the nozzle substrate 21, the compliance substrates 23, the communication plate 24, the pressure chamber substrate 25, the vibration plate 26, the sealing plate 27, and the casing 28 extends in the z-axis direction. The nozzle substrate 21 and the compliance substrates 23 are disposed at a bottom portion of the liquid ejecting head 10. The communication plate 24 is disposed in the z2 direction relative to the nozzle substrate 21 and the compliance substrates 23. The pressure chamber substrate 25 is disposed in the z2 direction relative to the communication plate 24. The vibration plate 26 is disposed in the z2 direction relative to the pressure chamber substrate 25. The piezoelectric elements 50A and 50B are formed on the vibration plate 26. The sealing plate 27 is disposed in the z2 direction relative to the vibration plate 26. The sealing plate 27 covers the piezoelectric elements 50. The casing 28 is disposed above the communication plate 24. The piezoelectric elements 50A are provided corresponding to the pressure chambers CA. The piezoelectric elements 50B are provided corresponding to the pressure chambers CB. Illustration of wiring portions 72 and 73 to be described later is omitted in FIG. 2. The wiring portions 72 and 73 are illustrated in FIGS. 4, 5, and 7.

Next, a description will be given of a flow channel 40 in which the ink flows. The liquid ejecting head 10 is provided with the flow channel 40 in which the ink flows. The flow channel 40 includes a supply port 42A, a discharge port 42B, the common liquid chambers RA and RB, relay flow channels 43A and 43B, the pressure chambers CA and CB, communication flow channels 45A to 45C, and nozzles N.

The flow channel 40 includes individual flow channels 41. The individual flow channels 41 are each provided corresponding to the nozzles N. The individual flow channels 41 include individual flow channels 41A and individual flow channels 41B. Each individual flow channel 41A includes the relay flow channel 43A, the pressure chamber CA, the communication flow channel 45A, and part of the communication flow channel 45C. The common liquid chamber RA communicates with the individual flow channels 41A in common and supplies the ink to the individual flow channels 41A. Each individual flow channel 41A is a portion of the individual flow channel 41 located upstream of the corresponding nozzle N.

Each individual flow channel 41B includes the relay flow channel 43B, the pressure chamber CB, the communication flow channel 45B, and part of the communication flow channel 45C. The common liquid chamber RB communicates with the individual flow channels 41B in common. The ink is discharged from the individual flow channels 41B to the common liquid chamber RB. The common liquid chamber RB discharges the ink from the individual flow channels 41B.

Figure 13:
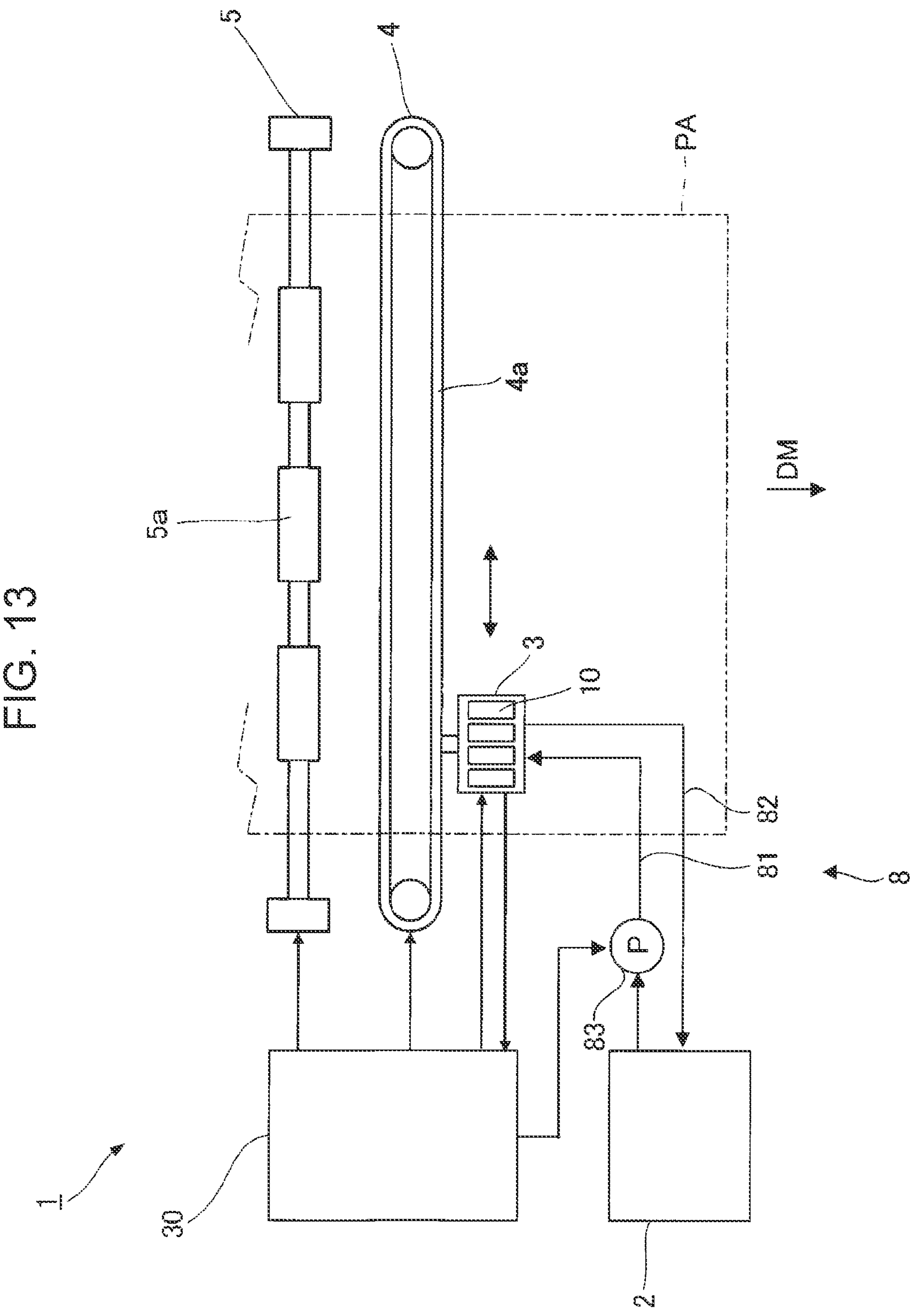
FIG. 13 is a schematic diagram illustrating a liquid ejecting apparatus according to an embodiment.

The liquid ejecting head 10 adopts a circulation system designed to circulate the ink that flows in the pressure chambers CA and CB. As illustrated in FIG. 13, a circulation mechanism 8 to circulate the ink is coupled to the liquid ejecting head 10. A liquid container 2 is coupled to the circulation mechanism 8. The circulation mechanism 8 includes a supply flow channel 81 that supplies the ink to the liquid ejecting head 10, a collection flow channel 82 that collects the ink discharged from the liquid ejecting head 10, and a pump 83 that transfers the ink. Each of the supply flow channel 81 and the collection flow channel 82 may be a flow channel inside a tube, for example. Each of the supply flow channel 81 and the collection flow channel 82 includes a flow channel formed from an opening, a groove, a recess, and the like.

The ink in the liquid container 2 is transferred by the pump 83. The ink flows in the supply flow channel 81, passes through the supply port 42A, and flows into the common liquid chamber RA. A portion of the common liquid chamber RA is formed in the communication plate 24 and another portion of the common liquid chamber RA is formed in the casing 28. The ink in the common liquid chamber RA passes through the relay flow channel 43A and is supplied to the pressure chamber CA. The ink in the pressure chamber CA passes through the communication flow channel 45A and the communication flow channel 45C and is ejected from the nozzle N.

The ink not ejected from the nozzle N passes through the communication flow channel 45C and the communication flow channel 45B and flows into the pressure chamber CB. The ink in the pressure chamber CB passes through the relay flow channel 43B, and is discharged to the common liquid chamber RB. The ink in the common liquid chamber RB flows into the collection flow channel 82 through the discharge port 42B and is collected by the liquid container 2. In the liquid ejecting head 10, the ink is circulated as described above.

Next, a structure of the liquid ejecting head 10 will be described. The nozzle substrate 21 illustrated in FIGS. 1 and 2 is provided with the nozzles N. The nozzles N form a line of nozzles NL. The line of nozzles NL includes the nozzles N arranged in the y-axis direction. Each nozzle N is a through hole that penetrates the nozzle substrate 21 in the z-axis direction.

The compliance substrates 23 are disposed on two sides in the x-axis direction of the nozzle substrate 21. Each compliance substrate 23 includes a flexible film. The compliance substrates 23 constitute bottom surfaces of the common liquid chambers RA and RB. The compliance substrates 23 are deformable by receiving a pressure of the ink. The compliance substrates 23 are deformed by the pressure of the ink and can absorb a variation in pressure of the ink in the liquid ejecting head 10.

The communication plate 24 is provided with portions of the common liquid chambers RA and RB, the relay flow channels 43A and 43B, and the communication flow channels 45A to 45C. The communication plate 24 is provided with through holes, grooves or recesses, and so forth. The portions of the common liquid chambers RA and RB, the relay flow channels 43, and the communication flow channels 45 are formed by these through holes, grooves or recesses, and so forth.

The common liquid chambers RA and RB are elongated in the y-axis direction. The common liquid chambers RA and RB correspond to the layout of the nozzles N in the y-axis direction. As illustrated in FIG. 2, upper portions of the common liquid chambers RA and RB are formed in the casing 28 and lower portions of the common liquid chambers RA and RB are formed in the communication plate 24. The lower portions of the common liquid chambers RA and RB formed in the communication plate 24 penetrate the communication plate 24 in the z-axis direction. A portion of the common liquid chamber RA close to the nozzles N is formed to a position overlapping the pressure chamber CA when viewed in the z-axis direction. Likewise, a portion of the common liquid chamber RB close to the nozzles N is formed to a position overlapping the pressure chamber CB when viewed in the z-axis direction.

The relay flow channel 43A establishes communication between the pressure chamber CA and the common liquid chamber RA. The relay flow channel 43A is provided to each of the pressure chambers CA. The relay flow channels 43A are disposed at given intervals in the y-axis direction. The relay flow channel 43B establishes communication between the pressure chamber CB and the common liquid chamber RB. The relay flow channel 43B is provided to each of the pressure chambers CB. The relay flow channels 43B are disposed at given intervals in the y-axis direction.

The communication flow channel 45A communicates with the pressure chamber CA and extends in the z-axis direction. The communication flow channel 45A is provided to each of the pressure chambers CA. The communication flow channel 45B communicates with the pressure chamber CB and extends in the z-axis direction. The communication flow channel 45B is provided to each of the pressure chambers CB.

The communication flow channels 45A and 45B penetrate the communication plate 24 in the z-axis direction. The communication flow channels 45A and 45B are located away from one another in the x-axis direction. Each communication flow channel 45A is disposed at a position overlapping the pressure chamber CA when viewed in the z-axis direction. Each communication flow channel 45B is disposed at a position overlapping the pressure chamber CB when viewed in the z-axis direction. Each communication flow channel 45C extends in the x-axis direction and establishes communication between the communication flow channel 45A and the communication flow channel 45B. The communication flow channel 45C is a groove which is recessed from a bottom surface of the communication plate 24. The communication flow channel 45C communicates with the corresponding nozzle N. The communication flow channels 45A to 45C are disposed at given intervals in the y-axis direction. The nozzle substrate 21 is disposed in such a way as to cover the communication flow channels 45A to 45C from below. Each pressure chamber CA and the corresponding pressure chamber CB communicate with each other by using the communication flow channels 45A to 45C.

The pressure chamber substrate 25 is provided with the pressure chambers CA and CB. The pressure chambers CA and CB penetrate the pressure chamber substrate 25 in the z-axis direction. Each of the pressure chambers CA and CB has a predetermined volume. The pressure chambers CA and CB are located away from each other in the x-axis direction. The pressure chambers CA are each provided corresponding to the nozzles N. The pressure chambers CA are disposed at given intervals in the y-axis direction. The pressure chambers CB are each provided corresponding to the nozzles N. The pressure chambers CB are disposed at given intervals in the y-axis direction. As described above, the line of pressure chambers CAL includes the pressure chambers CA. The pressure chamber substrate 25 can be produced from a single-crystalline substrate of silicon, for example. The pressure chamber substrate 25 may be produced from other materials.

Figure 6:
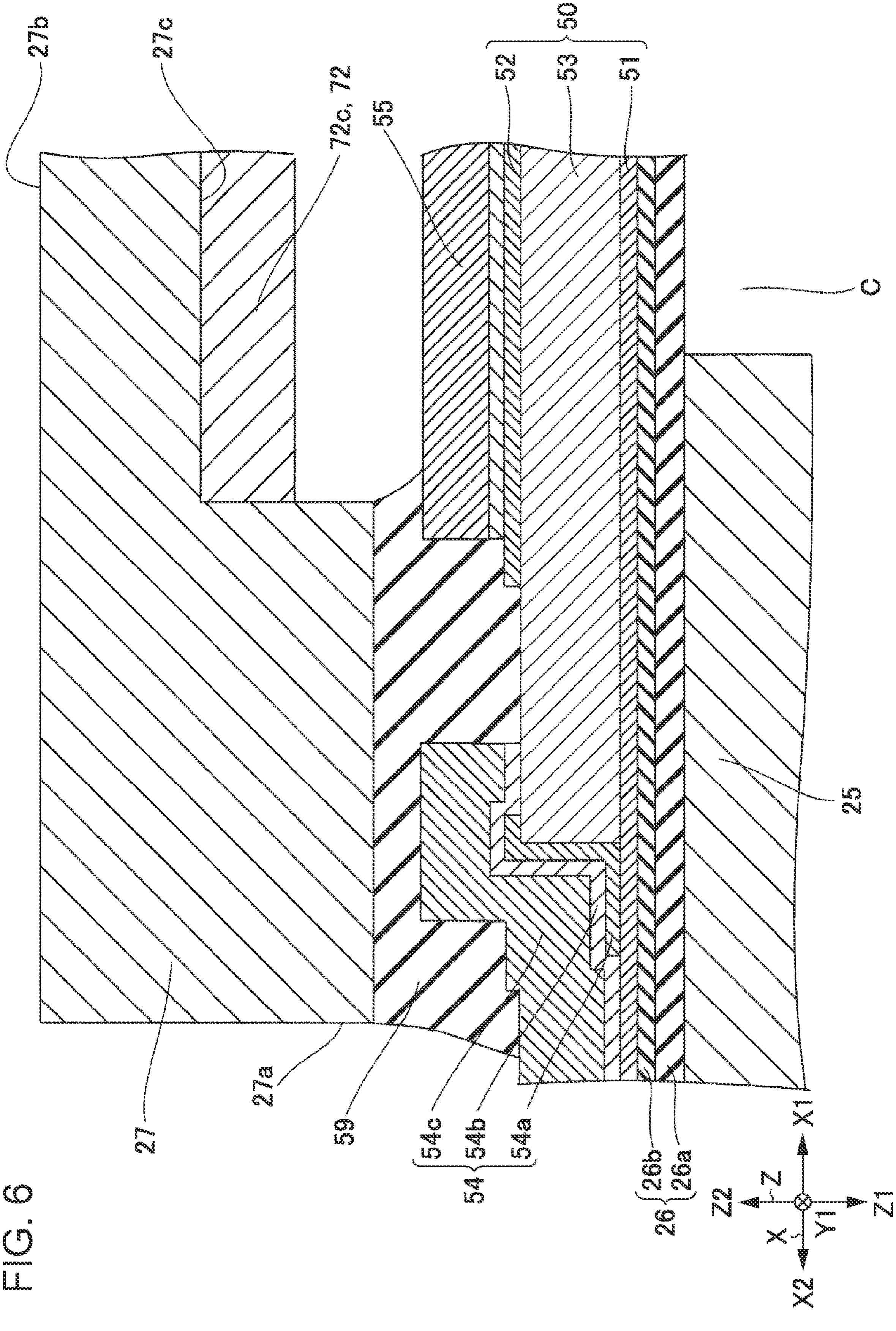
FIG. 6 is an enlarged sectional view illustrating the piezoelectric element, the COM line, and the VBS line.

FIG. 3 is a plan view illustrating the individual electrodes 51, the common electrode 52, the COM lines 54, and the VBS line 55 disposed above the pressure chamber substrate 25. FIG. 4 is a sectional view illustrating a cross-section of the liquid ejecting head 10 taken along YZ plane. FIG. 5 is an enlarged sectional view illustrating the cross-section of the liquid ejecting head 10 taken along the YZ plane. The YZ plane is a plane extending in the y-axis direction and the z-axis direction, and is a plane intersecting the x-axis direction. FIG. 4 illustrates the pressure chambers C arranged in the y-axis direction, and FIG. 5 illustrates an enlarged one of the pressure chambers C. FIG. 6 is an enlarged sectional view of the piezoelectric element 50, the COM line 54, and the VBS line 55.

The vibration plate 26 is disposed at an upper surface of the pressure chamber substrate 25. The vibration plate 26 covers openings of the pressure chamber substrate 25. Of the vibration plate 26, portions covering the openings of the pressure chamber substrate 25 constitute upper wall surface of the pressure chamber C.

The vibration plate 26 includes an elastic layer 26*a* and an insulating layer 26*b*. The elastic layer 26*a* is made of silicon dioxide ($SiO_2$), for example. The insulating layer 26*b* is made of zirconium dioxide ($ZrO_2$), for example. The elastic layer 26*a* is formed on the pressure chamber substrate 25 and the insulating layer 26*b* is formed on the elastic layer 26*a*.

The piezoelectric elements 50A and 50B are formed on the vibration plate 26. The piezoelectric elements 50A illustrated in FIGS. 1 and 2 are disposed at positions overlapping the pressure chambers CA when viewed in the z-axis direction. The piezoelectric elements 50B are disposed at positions overlapping the pressure chambers CB when viewed in the z-axis direction. The piezoelectric elements 50A are each provided corresponding to the pressure chambers CA. The piezoelectric elements 50B are each provided corresponding to the pressure chambers CB.

The vibration plate 26 is driven by the piezoelectric elements 50A and 50B and vibrates in the z-axis direction. A portion of the vibration plate 26 constituting the upper wall surface of each pressure chamber CA is driven by the piezoelectric element 50A above the pressure chamber CA. A portion of the vibration plate 26 constituting the upper wall surface of each pressure chamber CB is driven by the piezoelectric element 50B above the pressure chamber CB. A total thickness of the vibration plate 26 is equal to or below 2 μm, for example. The total thickness of the vibration plate 26 may be equal to or below 15 μm, or equal to or below 40 μm, or equal to or below 100 μm. When the total thickness of the vibration plate 26 is equal to or below 15 μm, for example, the vibration plate 26 may include a resin layer. The vibration plate 26 may be formed from a metal. Examples of the metal include stainless steel, nickel, and the like. When the vibration plate 26 is made of the metal, a plate thickness of the vibration plate 26 may be equal to or above 15 μm and equal to or below 100 μm.

As illustrated in FIGS. 3 to 5, the pressure chambers C include pressure chambers C1 and pressure chambers C2 which are arranged in the y-axis direction. Each "pressure chamber C1" represents an example of a "first pressure chamber". Each "pressure chamber C2" represents an example of a "second pressure chamber". The pressure chambers C1 and the pressure chambers C2 have the same structure, except that the pressure chambers C1 and C2 are located at different positions in the y-axis direction. One of the two pressure chambers C adjacent to each other in the y-axis direction will be defined as the "pressure chamber C1" and the other will be defined as the "pressure chamber C2". The pressure chambers C1 and the pressure chambers C2 are alternately disposed in the y-axis direction.

As illustrated in FIGS. 1 and 4, the nozzles N include nozzles N1 and nozzles N2 which are arranged in the y-axis direction. Each "nozzle N1" represents an example of a "first nozzle". Each "nozzle N2" represents an example of a "second nozzle". The nozzles N1 and the nozzles N2 have the same structure, except that the nozzles N1 and N2 are located at different positions in the y-axis direction. As illustrated in FIG. 4, each pressure chamber C1 communicates with the corresponding nozzle N1. Each pressure chamber C2 communicates with the corresponding nozzle N2.

As illustrated in FIGS. 4 and 5, each piezoelectric element 50 includes the individual electrode 51, the common electrode 52, and a piezoelectric body 53. The piezoelectric elements 50 include piezoelectric elements 501 and piezoelectric elements 502. Each piezoelectric element 501 represents an example of a "first piezoelectric element". Each piezoelectric element 502 represents an example of a "second piezoelectric element". The piezoelectric element 501 applies a pressure to the liquid in the pressure chamber C1. The piezoelectric element 502 applies a pressure to the liquid in the pressure chamber C2.

Each piezoelectric element 501 includes an individual electrode 511, a common electrode 521, and a piezoelectric body 531. Each piezoelectric element 502 includes an individual electrode 512, a common electrode 522, and a piezoelectric body 532. The piezoelectric elements 501 and 502 have the same structure. The "piezoelectric element 501" or the "piezoelectric element 502" may be referred to as the piezoelectric element 50 when the "piezoelectric element 501" and the "piezoelectric element 502" need not be distinguished from each other. Likewise, the "individual electrode 511" and the "individual electrode 512" may be referred to as the "individual electrode 51" when the "individual electrode 511" and the "individual electrode 512" need not be distinguished from each other. The "individual electrode 511" represents an example of a "first individual electrode". The "individual electrode 512" represents an example of a "second individual electrode".

The "common electrode 521" or the "common electrode 522" may be referred to as the common electrode 52 when the "common electrode 521" and the "common electrode 522" need not be distinguished from each other. The common electrode 521 includes a portion disposed above the individual electrode 511. The common electrode 522 includes a portion disposed above the individual electrode 512. The "piezoelectric body 531" or the "piezoelectric body 532" may be referred to as the piezoelectric body 53 when the "piezoelectric body 531" and the "piezoelectric body 532" need not be distinguished from each other. The "piezoelectric body 531" represents an example of a "first piezoelectric body". The "piezoelectric body 532" represents an example of a "second piezoelectric body".

The individual electrode 51, the piezoelectric body 53, and the common electrode 52 are stacked in this order above the vibration plate 26. The individual electrode 511, the piezoelectric body 531, and the common electrode 521 are located above the pressure chamber C1. The individual electrode 512, the piezoelectric body 532, and the common electrode 522 are located above the pressure chamber C2. The piezoelectric body 53 is sandwiched between the individual electrode 51 and the common electrode 52. The piezoelectric body 531 is sandwiched between the individual electrode 511 and the common electrode 521. The piezoelectric body 532 is sandwiched between the individual electrode 512 and the common electrode 522.

As illustrated in FIG. 3, each individual electrode 51 is formed into an elongated shape that extends in the x-axis direction. The individual electrodes 51 are arranged in the y-axis direction at intervals in between. The individual electrodes 51 are each disposed corresponding to the pressure chambers C. As illustrated in FIG. 4, the pressure chamber C1 is provided with the individual electrode 511. The pressure chamber C2 is provided with the individual electrode 512. The individual electrode 511 is disposed at a position overlapping the pressure chamber C1 when viewed in the z-axis direction. The individual electrode 512 is disposed at a position overlapping the pressure chamber C2 when viewed in the z-axis direction.

Each common electrode 52 takes on a strip shape and extends in the y-axis direction. The common electrode 52 is continuously provided in such a way as to cover the individual electrodes 511 and 512. Of the common electrode 52 extending in the y-axis direction, a portion located above the individual electrode 511 may be defined as the common electrode 521 and a portion located above the individual electrode 512 may be defined as the common electrode 522.

The individual electrode 51 includes a foundation layer and an electrode layer. The foundation layer includes titanium (Ti), for example. The electrode layer includes, for example, a low-resistance conductive material, such as platinum (Pt) or iridium (Ir). The electrode layer may be formed from an oxide, such as strontium ruthenate ($SrRuO_3$) and lanthanum nickel oxide ($LaNiO_3$). The piezoelectric body 53 is formed from a known piezoelectric material, such as lead zirconate titanate ($Pb(Zr,Ti)O_3$) or ceramics.

Each common electrode 52 includes a foundation layer and an electrode layer. The foundation layer includes titanium, for example. The electrode layer includes a low-resistance conductive material, such as platinum or iridium. The electrode layer may be formed from an oxide, such as strontium ruthenate and lanthanum nickel oxide. A region of the piezoelectric body 53 located between the individual electrode 51 and the common electrode 52 serves as a driving region. A region of the piezoelectric body 531 located between the individual electrode 511 and the common electrode 521 serves as the driving region. A region of the piezoelectric body 532 located between the individual electrode 512 and the common electrode 522 serves as the driving region. The driving regions of the piezoelectric bodies 53 are each formed above the corresponding pressure chambers C. Portions, other than the driving regions, of the piezoelectric bodies 531 and 532 may be coupled to each other.

A prescribed reference voltage is applied to the common electrodes 52. The reference voltage is a constant voltage, which is set to a voltage higher than a ground voltage, for example. A retention signal at a constant voltage is applied to the common electrodes 52, for example. Driving signals at variable voltages are applied to the individual electrodes 51. A voltage corresponding to a difference between the reference voltage to be applied to the common electrodes 52 and the driving signal to be applied to the individual electrodes 51 is applied to the piezoelectric bodies 53. A voltage corresponding to the difference between the reference voltage to be applied to the common electrode 521 and the driving signal to be applied to the individual electrode 511 is applied to the piezoelectric body 531. A voltage corresponding to the difference between the reference voltage to be applied to the common electrode 522 and the driving signal to be applied to the individual electrode 512 is applied to the piezoelectric body 532. The driving signal corresponds to an amount of ejection of the liquid to be ejected from the nozzle N.

As a consequence of deformation of the piezoelectric body 531 along with the application of the voltage between the individual electrode 51 and the common electrode 521, the piezoelectric element 501 creates energy for flexurally deforming the vibration plate 26. Likewise, as a consequence of deformation of the piezoelectric body 532 along with the application of the voltage between the individual electrode 512 and the common electrode 522, the piezoelectric element 502 creates energy for flexurally deforming the vibration plate 26.

The vibration of the vibration plate 26 with the energy generated by the piezoelectric element 501 changes the pressure of the liquid in the pressure chamber C1, whereby the liquid in the pressure chamber C1 is ejected from the nozzle N1. The vibration of the vibration plate 26 with the energy generated by the piezoelectric element 502 changes the pressure of the liquid in the pressure chamber C2, whereby the liquid in the pressure chamber C2 is ejected from the nozzle N2.

The sealing plate 27 is formed into a rectangular shape when viewed in the z-axis direction. The sealing plate 27 protects the piezoelectric elements 50 and reinforces mechanical strengths of the pressure chamber substrate 25 and the vibration plate 26. The sealing plate 27 is attached to the vibration plate 26 by using an adhesive, for example. The sealing plate 27 is fixed to the pressure chamber substrate 25 with the vibration plate 26 in between. The wiring portion 72 is formed at lower surfaces 27*c*, 27*d*, and 27*e* of the sealing plate 27. Details will be described later.

As illustrated in FIGS. 1 and 2, the COF 60 includes a flexible wiring board 61 and a driving circuit 62. The flexible wiring board 61 is a wiring board having flexibility. The flexible wiring board 61 is an FPC, for example. The flexible wiring board 61 may be an FFC, for instance. The FPC stands for flexible printed circuit. The FFC stands for flexible flat cable.

As illustrated in FIG. 2, the flexible wiring board 61 is electrically coupled to the individual electrodes 51 of the piezoelectric elements 50 via the COM lines 54 to be described later. The flexible wiring board 61 is electrically coupled to the common electrode 52 of the piezoelectric elements 50 via VBS line 55 to be described later. The flexible wiring board 61 is electrically coupled to a circuit board (not illustrated). The circuit board includes a driving signal generation circuit 32 illustrated in FIG. 14.

The driving circuit 62 is mounted on the flexible wiring board 61. The driving circuit 62 includes a switching element for driving the piezoelectric elements 50. The driving circuit 62 is electrically coupled to a control unit 30 illustrated in FIG. 14 via the flexible wiring board 61 and the circuit board. The driving circuit 62 receives a driving signal Com outputted from the driving signal generation circuit 32. The switching element of the driving circuit 62 switches whether or not to supply the driving signal Com generated by the driving signal generation circuit 32 to the piezoelectric elements 50. The driving circuit 62 causes the vibration plate 26 to vibrate by supplying a driving voltage or a driving current to the piezoelectric elements 50.

As illustrated in FIGS. 3 and 6, the liquid ejecting head 10 includes the COM lines 54. The COM lines 54 are electrically coupled to the piezoelectric elements 50. The COM lines 54 are each coupled to the corresponding individual electrodes 51.

The COM lines 54 extend in the x-axis direction and are drawn into an opening 27*a* in the sealing plate 27. The opening 27*a* is illustrated in FIGS. 1 and 2. Illustration of the COM lines 54 is omitted in FIG. 1. The opening 27*a* penetrates the sealing plate 27 in the z-axis direction. The COM lines 54 are electrically coupled to the COF 60 at a position corresponding to the opening 27*a* when viewed in the z-axis direction. The COM lines 54 are made of a conductive material having lower resistance than that of the individual electrodes 51. For example, the COM lines 54 are conductive patterns having a structure of laminating a gold (Au) conductive film on a surface of a conductive film made of nichrome (NiCr).

As illustrated in FIG. 6, each of the COM lines 54 includes an electrode layer 54*a*, a first adhesion layer 54*b*, and a first wiring layer 54*c*. The electrode layer 54*a* covers an end surface in the x2 direction of the piezoelectric body 53. The end surface in the x2 direction forms a surface intersecting the x-axis direction. The first adhesion layer 54*b* covers the electrode layer 54*a* and the individual electrode 51. The first adhesion layer 54*b* adheres to the electrode layer 54*a* and the individual electrode 51. The first wiring layer 54*c* covers the first adhesion layer 54*b*. The first wiring layer 54*c* is electrically coupled to the individual electrode 51 via the first adhesion layer 54*b*.

The COM lines 54 are electrically coupled to the flexible wiring board 61 via a COF mounting portion 64 illustrated in FIG. 2. The COF mounting portion 64 includes a conductive layer that electrically couples the first wiring layer 54*c* of the COM lines 54 to a wiring portion of the flexible wiring board 61. Each individual electrode 51 is electrically coupled to the driving circuit 62 via the COM line 54, the COF mounting portion 64, and the flexible wiring board 61.

As illustrated in FIGS. 3 to 8, the liquid ejecting head 10 includes the VBS line 55. The VBS line 55 is electrically coupled to the common electrode 52. The VBS line 55 is electrically coupled to the COF 60 via VBS line mounting portions (not illustrated). The VBS line mounting portions are disposed at two end portions in the y-axis direction of the liquid ejecting head 10, for example. The "VBS line 55" represents an example of a "first wiring portion".

As illustrated in FIG. 6, the VBS line 55 is located away from the COM line 54 in the x-axis direction. An insulating adhesive 59 is provided between the VBS line 55 and the COM line 54. The sealing plate 27 is attached to the VBS line 55, the piezoelectric body 53, the COM lines 54, and the like by using the adhesive 59.

As illustrated in FIG. 3, the VBS line 55 extends in the y-axis direction. The VBS line 55 is disposed above the common electrode 52. The liquid ejecting head 10 may include multiple VBS lines 55 above the common electrode 52 in such a way as to be located away from each other in the x-axis direction. The VBS line 55 may be formed in such a way as to cover the entire width of the common electrode 52 in the x-axis direction. The VBS line 55 is formed in such a way as to overlap the pressure chambers C when viewed in the z-axis direction. The VBS line 55 may be formed in such a way as to overlap all the pressure chambers C arranged in the y-axis direction. The VBS line 55 may be formed partially in the y-axis direction. A material for the VBS line 55 is gold (Au), for example. The material for the VBS line 55 is not limited to gold and may be other metals.

As illustrated in FIGS. 4 and 5, the liquid ejecting head 10 includes the wiring portion 72 and the wiring portion 73. The wiring portion 72 is provided at lower surfaces 27*c*, 27*d*, 27*e*, and 27*f* of the sealing plate 27. The wiring portion 73 is provided between the VBS line 55 and the wiring portion 72, and electrically couples the VBS line 55 to the wiring portion 72. The "wiring portion 72" represents an example of a "second wiring portion" and the "wiring portion 73" represents an example of a "third wiring portion".

As illustrated in FIG. 5, the sealing plate 27 includes a ceiling surface 27*b* and the lower surfaces 27*c*, 27*d*, 27*e*, and 27*f*. The ceiling surface 27*b* is a surface on an upper side. The lower surface 27*c* is a surface on a lower side located in the z1 direction relative to the ceiling surface 27*b*.

The sealing plate 27 includes protruding portions 27*g* which protrude in the z1 direction from the lower surface 27*c* (in other words, which are convex in the z1 direction beyond the lower surface 27*c*). The protruding portions 27*g* protrude from the lower surface 27*c* toward the pressure chamber substrate 25. The protruding portions 27*g* extend in the x-axis direction. The protruding portions 27*g* are disposed at given intervals in the y-axis direction.

Each protruding portion 27*g* includes the lower surfaces 27*e*, 27*f*, and 27*d*. The lower surfaces 27*e* and 27*d* define inclined surfaces of the protruding portion 27*g*. The lower surfaces 27*e* and 27*d* are inclined relative to the lower surface 27*c*. The lower surfaces 27*e* and 27*d* are inclined relative to XY plane. The XY plane is a plane extending in the x-axis direction and the y-axis direction. The lower surfaces 27*e* and 27*d* are inclined relative to an upper surface 25*a* of the pressure chamber substrate 25. The lower surface 27*e* is adjacent to the lower surface 27*c* in the y2 direction. The lower surface 27*d* is adjacent to the lower surface 27*c* in the y1 direction.

The lower surface 27*f* defines a bottom surface of the protruding portion 27*g*. The lower surface 27*f* is located between the lower surface 27*e* and the lower surface 27*d* in the y-axis direction. The lower surface 27*f* extends in the XY plane. The lower surface 27*f* is disposed at a position different from the lower surface 27*c* in the z-axis direction. The lower surface 27*f* is located between the pressure chamber C1 and the pressure chamber C2 in the y-axis direction.

The wiring portion 72 is disposed along the lower surfaces 27*c*, 27*d*, 27*e*, and 27*f* of the sealing plate 27 as described above. The wiring portion 72 includes a conductive layer. The wiring portion 72 has a prescribed thickness. The wiring portion 72 is disposed in such a way as to overlap the piezoelectric elements 50 when viewed in the z-axis direction. The wiring portion 72 and the VBS line 55 are located away from each other in the z-axis direction. The wiring portion 72 is formed in such a way as to cover the lower surfaces 27*c*, 27*d*, 27*e*, and 27*f* from below.

The wiring portion 72 includes portions 72*c*, 72*d*, 72*e*, and 72*f*. These portions 72*c*, 72*d*, 72*e*, and 72*f* are continuously provided in the y-axis direction. The portion 72*c* is formed in such a way as to cover the 27*c* of the sealing plate 27. The portion 72*d* is formed in such a way as to cover the lower surface 27*d* of the sealing plate 27. The portion 72*d* is inclined relative to the portion 72*c*. The portion 72*e* is formed in such a way as to cover the lower surface 27*e* of the sealing plate 27. The portion 72*e* is inclined relative to the portion 72*c*. The portion 72*f* is formed in such a way as to cover the lower surface 27*f* of the sealing plate 27. The portions 72*d*, 72*e*, and 72*f* are formed in such a way as to cover the protruding portion 27*g*.

As mentioned above, the wiring portion 73 electrically couples the VBS line 55 to the wiring portion 72. The wiring portion 73 is provided between the piezoelectric elements 50 in the y-axis direction. The wiring portion 73 is located between the piezoelectric element 501 and the piezoelectric element 502 in the y-axis direction. The wiring portion 73 is electrically coupled to the portion 72*f* of the wiring portion 72. The wiring portion 73 couples the wiring portion 72 to the VBS line 55 in the z-axis direction.

The pressure chamber substrate 25 includes partition walls 25*c* that define the pressure chambers C in the y-axis direction. Each partition wall 25*c* is located between the pressure chamber C1 and the pressure chamber C2 in the y-axis direction. The protruding portion 27*g* of the sealing plate 27 is disposed in such a way as to overlap the partition wall 25*c* when viewed in the z-axis direction. The lower surface 27*f* of the protruding portion 27*g* is disposed in such a way as to overlap the partition wall 25*c* when viewed in the z-axis direction.

The wiring portion 73 is disposed in such a way as to overlap the partition wall 25*c* when viewed in the z-axis direction. The wiring portion 73 is disposed above the partition wall 25*c*. The wiring portion 73 is electrically coupled to the VBS line 55 at a position above the partition wall 25*c*.

FIG. 7 is a sectional view illustrating the VBS line 55, the wiring portion 72, and the wiring portion 73. FIG. 7 illustrates a cross-section taken along the YZ plane. A thickness t2 of the wiring portion 72 is larger than a thickness t1 of the VBS line 55. The thickness t2 of the wiring portion 72 is a thickness in a direction intersecting a direction of extension of the wiring portion 72. The thickness t2 of the wiring portion 72 may be a thickness of the portion 72*c*, for example. The thickness of the portion 72*c* extends in the z-axis direction. The thickness t1 of the VBS line 55 may be a thickness in the z-axis direction. The thickness t2 of the wiring portion 72 may be an average thickness of the entire length of the wiring portion 72. The thickness t1 of the VBS line 55 may be an average thickness of the entire length of the VBS line 55. The thickness t1 of the VBS line 55 may be a thickness at a position above the piezoelectric element 50. It is possible to achieve reduction in resistance by setting the thickness t2 of the wiring portion 72 larger than the thickness t1 of the VBS line 55. Since the VBS line 55 is provided above the piezoelectric element 50, an attempt to reduce the resistance by increasing the thickness t1 of the VBS line 55 may affect deformability of the piezoelectric element 50 and is apt to affect a performance to eject the liquid. By increasing the thickness t2 of the wiring portion 72, it is possible to achieve the reduction in resistance without affecting the performance to eject the liquid by using the piezoelectric element 50. By increasing the thickness t2 of the wiring portion 72 in contact with the sealing plate 27, it is possible to increase rigidity of the sealing plate 27 so as to suppress deformation of the pressure chamber substrate 25. Thus, reduction in structural crosstalk can be achieved.

A thickness t3 of the wiring portion 73 is larger than the thickness t1 of the VBS line 55. The thickness t3 of the wiring portion 73 is larger than the thickness t2 of the wiring portion 72. The thickness t3 of the wiring portion 73 is a thickness thereof in the z-axis direction. The thickness t3 of the wiring portion 73 may be a thickness obtained by subtracting the thickness t1 from a thickness t4. The thickness t4 corresponds to a length in the z-axis direction between the lower surface 27*f* of the protruding portion 27*g* and the VBS line 55. The thickness t4 is larger than the thickness t1.

A width W2 of the wiring portion 73 is smaller than a width W1 of the partition wall 25*c* between the pressure chambers C. The width W2 of the wiring portion 73 is equivalent to a length thereof in the y-axis direction. The partition wall 25*c* has a length in the y-axis direction. The wiring portion 73 is disposed within the width W1 of the partition wall 25*c* when viewed in the z-axis direction. The width W2 of the wiring portion 73 may be substantially equal to a width in the y-axis direction of the lower surface 27*f* of the protruding portion 27*g*.

The wiring portion 72 and the wiring portion 73 are made of the same material, for example. The wiring portion 72 and the wiring portion 73 are made of gold, for instance. The VBS line 55 as well as the wiring portions 72 and 73 are made of the same material, such as gold. The VBS line 55 as well as the wiring portions 72 and 73 may be made of a metal other than gold. The VBS line 55 as well as the wiring portions 72 and 73 need not be made of the same material. Bonding quality is improved when the VBS line 55 as well as the wiring portions 72 and 73 are made of the same material. A junction between the VBS line 55 and the wiring portion 73 is disposed at a position overlapping the partition wall 25*c* when viewed in the z-axis direction.

According to the above-described liquid ejecting head 10, it is possible to supply a voltage to the common electrode 52 via the VBS line 55. Since the liquid ejecting head 10 includes the wiring portion 72 and the wiring portion 73 electrically coupled to the VBS line 55, the voltage can be supplied to the common electrode 52 via the wiring portion 72 and the wiring portion 73. In the liquid ejecting head 10, the voltage can be supplied to the common electrode 52 via the COF 60, the wiring portion 72, the wiring portion 73, and the VBS line 55. In the liquid ejecting head 10, the voltage can be supplied to the common electrode 52 by using the wiring portion 72 and the wiring portion 73 in addition to the VBS line 55. Accordingly, it is possible to reduce the resistance of wiring coupled to the common electrode 52. The liquid ejecting head 10 can suppress an effect of a voltage drop to be supplied to the common electrode 52. The liquid ejecting head 10 can suppress a delay of a current to the common electrode 52.

Since the liquid ejecting head 10 includes the wiring portion 72 and the wiring portion 73, it is possible to reduce the resistance in the VBS line 55 while avoiding an increase in the thickness t1 of the VBS line 55. The related art has a difficulty in further increasing the thickness t1 of the VBS line 55, for example. There is also a difficulty in accurately cutting the VBS line 55 when the VBS line 55 is made excessively thick. It is therefore not easy to reduce electric resistance by increasing the thickness of the VBS line 55. In the liquid ejecting head 10, the wiring portion 72 and the wiring portion 73 are formed along the lower surface of the sealing plate 27. Accordingly, it is possible to reduce the resistance of the VBS line 55 while avoiding the increase in thickness of the VBS line 55.

In the liquid ejecting head 10, the sealing plate 27 is fixed to the pressure chamber substrate 25 and to the vibration plate 26 by using the adhesive 59 as illustrated in FIG. 6. For example, when an amount of the adhesive 59 for attaching the sealing plate 27 is large in the related art, the adhesive is prone to spread out of a desired position. If an adhesive is excessively used, for instance, the adhesive may spread into the opening 27*a* or spread into a space sealed with the sealing plate 27. If such excessive adhesive is used, the adhesive permeating the vibration plate 26 may leak into the pressure chambers C.

As illustrated in FIG. 5, the liquid ejecting head 10 includes the protruding portion 27*g* that protrudes from the lower surface 27*c* of the sealing plate 27 toward the pressure chamber substrate 25, and the vibration plate 26 can thus be pressed against the partition walls 25*c* of the pressure chamber substrate 25 by using the protruding portions 27*g* and the wiring portion 73 provided at the lower surface of the protruding portions 27*g*. This makes it possible to bond the pressure chamber substrate 25, the vibration plate 26, and the sealing plate 27 together without increasing the amount of use of the adhesive 59 for attaching the sealing plate 27. The liquid ejecting head 10 can improve the bonding quality while maintaining the amount of use of the adhesive 59 at an appropriate level. The liquid ejecting head 10 reduces a risk of a leakage of the adhesive 59 to its surroundings. For example, the liquid ejecting head 10 suppresses the leakage of the adhesive 59 into the opening 27*a* in the sealing plate 27, the leakage of the adhesive 59 into the sealed space, and the leakage of the adhesive 59 into the pressure chambers C.

Since the amount of use of the adhesive 59 is maintained at an appropriate level, the liquid ejecting head 10 reduces the amount of the adhesive that permeates the vibration plate 26. For example, an increase in amount of the adhesive that permeates the vibration plate 26 above the pressure chambers C reduces vibration of the vibration plate 26. Since the amount of the adhesive that permeates the vibration plate 26 is suppressed in the liquid ejecting head 10, the vibration of the vibration plate 26 is not disturbed. As a consequence, reliability of the performance of the liquid ejecting head 10 to eject the liquid is improved.

In the liquid ejecting head 10, the protruding portion 27*g* of the sealing plate 27 and the wiring portion 73 are disposed above each partition wall 25*c* between the pressure chambers C. The protruding portion 27*g* and the wiring portion 73 can press the partition wall 25*c* as well as the vibration plate 26 above the partition wall 25*c*. This suppresses deflection of the partition wall 25*c*. An increase in deflection of the partition wall 25*c* may affect the performance to eject the liquid from each pressure chamber C. The liquid ejecting head 10 can improve accuracy of the performance to eject the liquid since the deflection of the partition wall 25*c* is suppressed.

Embodiment 2

Figure 8:
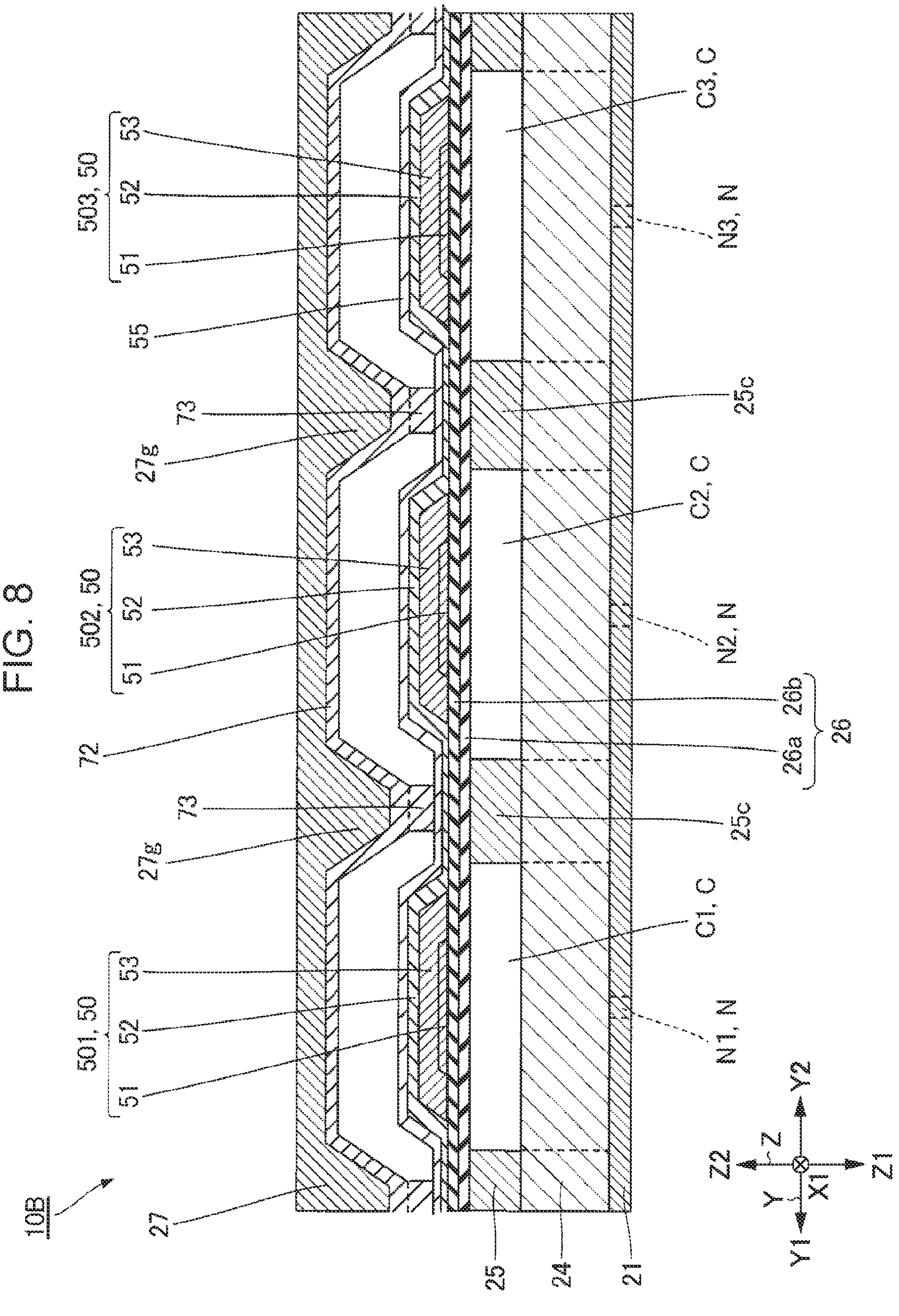
FIG. 8 is a sectional view illustrating a liquid ejecting head according to Embodiment 2.

Next, a liquid ejecting head 10B according to Embodiment 2 will be described. FIG. 8 is a sectional view illustrating the liquid ejecting head according to the Embodiment 2. The Embodiment 2 has the same structure as that of the Embodiment 1. FIG. 8 illustrates three pressure chambers C1 to C3 arranged in the y-axis direction. The Embodiment 2 will describe the liquid ejecting head 10B by showing the pressure chambers C1 to C3 as examples. In the description of the liquid ejecting head 10B, the same explanations as those of the liquid ejecting head 10 of the Embodiment 1 may be omitted as appropriate.

The liquid ejecting head 10B includes the pressure chambers C. The pressure chambers C include the pressure chambers C1 to C3. The pressure chambers C1 to C3 are disposed at given intervals in the y-axis direction. The pressure chambers C1 to C3 are arranged in this order. The pressure chamber C2 is located between the pressure chamber C1 and the pressure chamber C3 in the y-axis direction. The "pressure chamber C3" represents an example of a "third pressure chamber".

The pressure chamber substrate 25 is provided with the nozzles N arranged in the y-axis direction. The nozzles N include nozzles N1 to N3. A line of nozzles NL includes the nozzles N1 to N3. The nozzles N1 to N3 are arranged in this order. The nozzle N2 is located between the nozzle N1 and the nozzle N3 in the y-axis direction. The "nozzle N3" represents an example of a "third nozzle". The nozzle N3 communicates with the pressure chamber C3. The liquid in the pressure chamber C3 is ejected from the nozzle N3.

The liquid ejecting head 10B includes the piezoelectric elements 50 arranged in the y-axis direction. The piezoelectric elements 50 include the piezoelectric element 501, the piezoelectric element 502, and a piezoelectric element 503. The piezoelectric elements 501 to 503 are arranged in this order. The piezoelectric element 502 is located between the piezoelectric element 501 and the piezoelectric element 503 in the y-axis direction. The "piezoelectric element 503" represents an example of a "third piezoelectric element".

Each piezoelectric element 50 includes the individual electrode 51, the common electrode 52, and the piezoelectric body 53. The piezoelectric element 503 includes the individual electrode 51, the common electrode 52, and the piezoelectric body 53. The piezoelectric element 503 is disposed at a position overlapping the pressure chamber C3 when viewed in the z-axis direction. The individual electrode 51 of the piezoelectric element 503 represents an example of a "third individual electrode". The piezoelectric body 53 of the piezoelectric element 503 represents an example of a "third piezoelectric element".

Each wiring portion 73 electrically couples the wiring portion 72 to the VBS line 55. Each wiring portion 73 is provided between the piezoelectric elements 50. One wiring portion 73 is located between the piezoelectric element 501 and the piezoelectric element 502. Another wiring portion 73 is located between the piezoelectric element 502 and the piezoelectric element 503. The wiring portion 73 located between the piezoelectric element 502 and the piezoelectric element 503 represents an example of a "fourth wiring portion". The wiring portion 73 may be provided at every space between the piezoelectric elements 50.

The above-described liquid ejecting head 10B according to the Embodiment 2 is also acceptable. In the liquid ejecting head 10B including the piezoelectric elements 501 to 503, the wiring portion 73 may be provided between the piezoelectric element 501 and the piezoelectric element 502 and the wiring portion 73 may be provided between the piezoelectric element 502 and the piezoelectric element 503. The above-described liquid ejecting head 10B according to the Embodiment 2 also has the same operation and effects as those of the above-described liquid ejecting head 10 according to the Embodiment 1.

Embodiment 3

Figure 9:
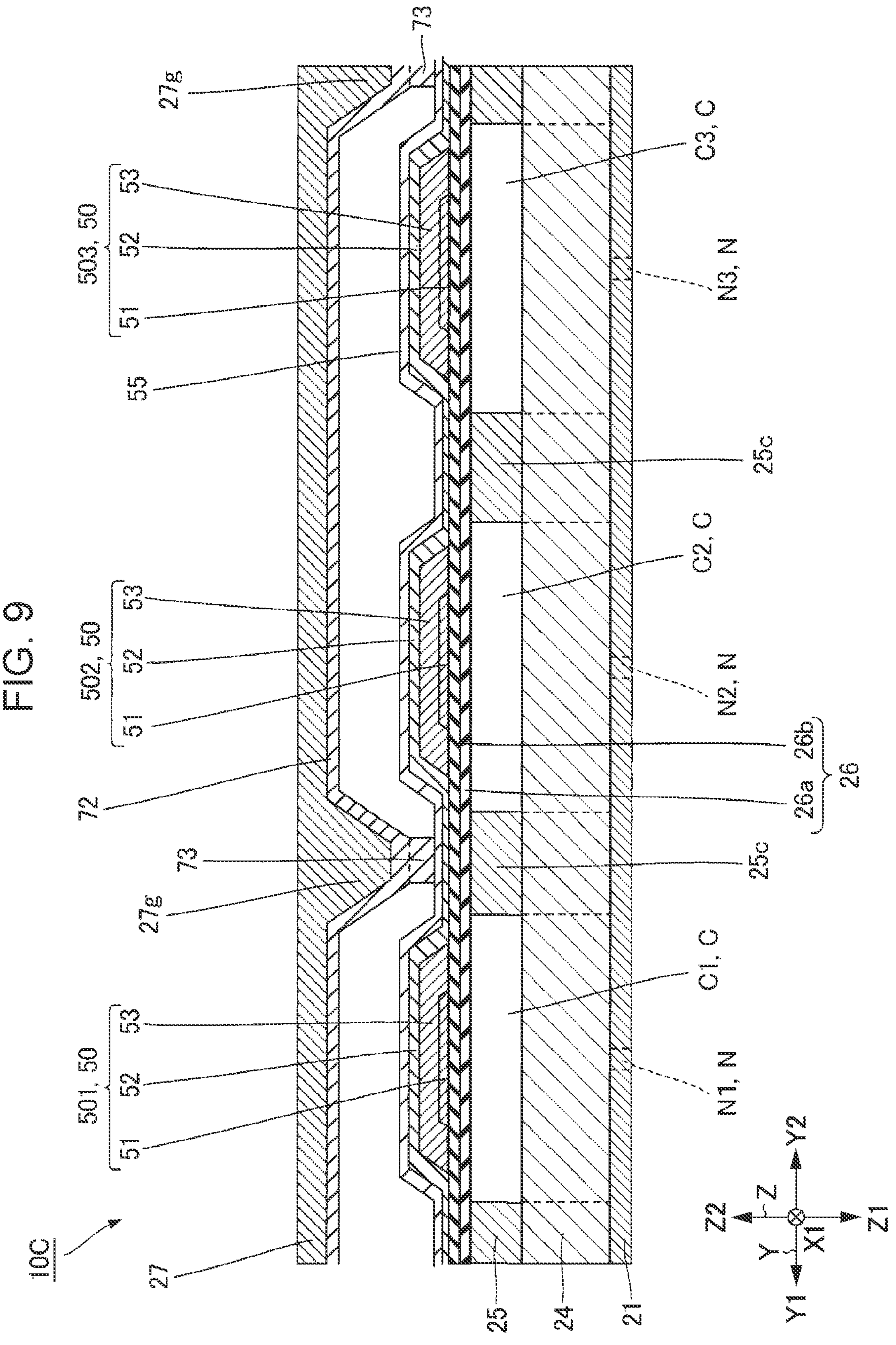
FIG. 9 is a sectional view illustrating a liquid ejecting head according to Embodiment 3.

Next, a liquid ejecting head 10C according to Embodiment 3 will be described. FIG. 9 is a sectional view illustrating the liquid ejecting head 10C according to the Embodiment 3. The liquid ejecting head 10C according to the Embodiment 3 is different from the liquid ejecting head 10B according to the Embodiment 2 illustrated in FIG. 8 in that the protruding portion 27*g* of the sealing plate 27 is not formed between the piezoelectric element 502 and the piezoelectric element 503 and that the wiring portion 73 is not provided between the piezoelectric element 502 and the piezoelectric element 503. In the description of the liquid ejecting head 10C of the Embodiment 3, the same explanations as those of the liquid ejecting heads 10 and 10B of the Embodiments 1 and 2 will be omitted.

As mentioned above, the wiring portions 73 do not always have to be provided on two sides of each piezoelectric element 50. The configuration in which the wiring portion 73 is provided on one side in the y-axis direction of the piezoelectric element 50 is also acceptable. In the liquid ejecting head 10C, the wiring portion 73 is provided between the piezoelectric element 501 and the piezoelectric element 502 but the wiring portion 73 is not provided between the piezoelectric element 502 and the piezoelectric element 503.

Likewise, in the liquid ejecting head 10C, the protruding portion 27*g* is provided between the piezoelectric element 501 and the piezoelectric element 502 but the protruding portion 27*g* is not provided between the piezoelectric element 502 and the piezoelectric element 503.

Embodiment 4

Figure 10:
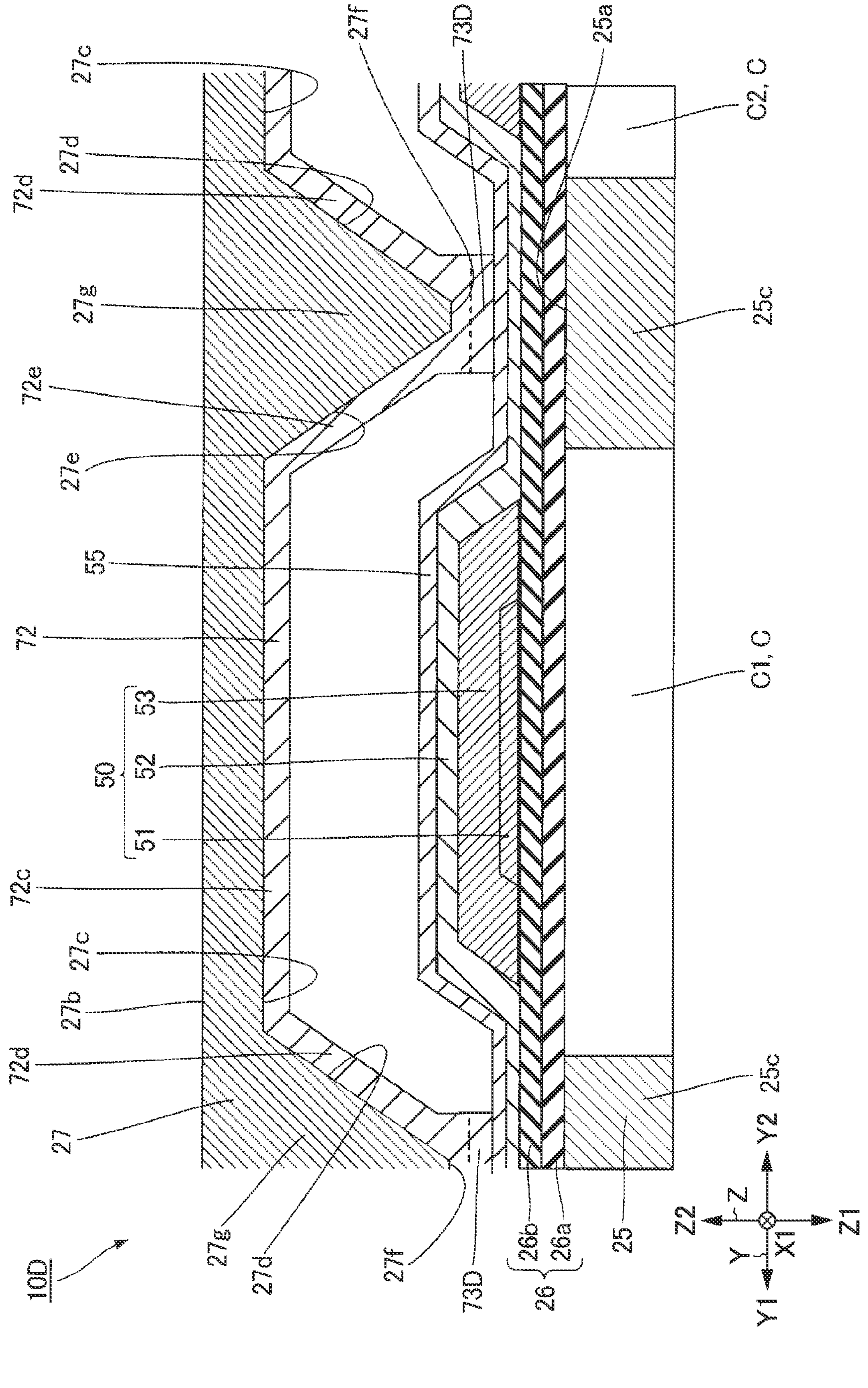
FIG. 10 is a sectional view illustrating a liquid ejecting head according to Embodiment 4.

Next, a liquid ejecting head 10D according to Embodiment 4 will be described. FIG. 10 is a sectional view illustrating the liquid ejecting head 10D according to the Embodiment 4. The liquid ejecting head 10D according to the Embodiment 4 is different from the liquid ejecting head 10 according to the Embodiment 1 illustrated in FIG. 5 in that the length in the z-axis direction of the protruding portion 27*g* of the sealing plate 27 is different, and that a wiring portion 73D is provided instead of the wiring portion 73. In the description of the liquid ejecting head 10D, the same explanations as those of the liquid ejecting head 10 will be omitted.

The lower surface 27*f* of the protruding portion 27*g* illustrated in FIG. 5 is located above the VBS line 55 on the individual electrode 51. In the liquid ejecting head 10D illustrated in FIG. 10, the lower surface 27*f* of the protruding portion 27*g* is located below the VBS line 55 on the individual electrode 51. A distance between the upper surface 25*a* of the pressure chamber substrate 25 and the lower surface 27*f* of the protruding portion 27*g* of the liquid ejecting head 10D is smaller than a distance between the upper surface 25*a* of the pressure chamber substrate 25 and the lower surface 27*f* of the protruding portion 27*g* of the liquid ejecting head 10.

A length in the z-axis direction of the wiring portion 73D of the liquid ejecting head 10D is smaller than the length in the z-axis direction of the wiring portion 73 of the liquid ejecting head 10.

As described above, in the liquid ejecting head 10D, the protruding portion 27*g* of the sealing plate 27 is disposed at a position closer to the upper surface 25*a* of the pressure chamber substrate 25. This makes it possible to reduce the length in the z-axis direction of the wiring portion 73D.

Embodiment 5

Figure 11:
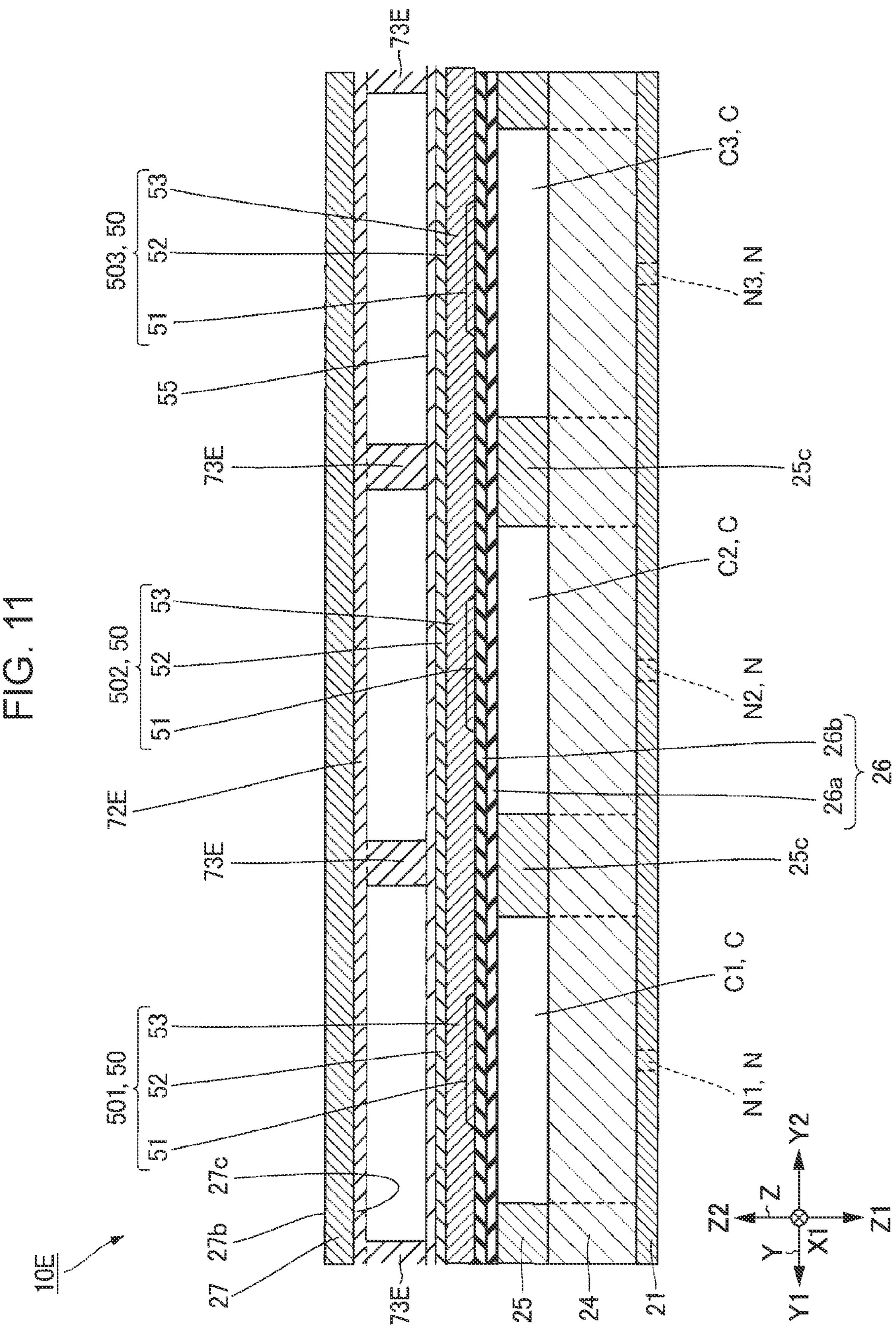
FIG. 11 is a sectional view illustrating a liquid ejecting head according to Embodiment 5.

Next, a liquid ejecting head 10E according to Embodiment 5 will be described. FIG. 11 is a sectional view illustrating the liquid ejecting head 10E according to the Embodiment 5. The liquid ejecting head 10E according to the Embodiment 5 is different from the liquid ejecting head 10B according to the Embodiment 2 illustrated in FIG. 8 in that the sealing plate 27 is not provided with the protruding portions 27*g*, that the piezoelectric body 53 is formed continuously in the y-axis direction, that a position in the z-axis direction of the common electrode 52 is constant, that a position in the z-axis direction of the VBS line 55 is constant, that a position in the z-axis direction of each wiring portion 72E is constant, and that wiring portions 73E are provided instead of the wiring portions 73. In the description of the liquid ejecting head 10E, the same explanations as those of the above-described liquid ejecting heads 10 and 10B will be omitted.

As illustrated in FIG. 11, the piezoelectric body 53 is continuously formed in the y-axis direction. The piezoelectric body 53 is also present above the partition walls 25*c* between the pressure chambers C arranged in the y-axis direction. A position of an upper surface of the piezoelectric body 53 is constant in the z-axis direction. For example, the position of the upper surface of the piezoelectric body 53 above the individual electrode 51 is substantially the same as the position of the upper surface of the piezoelectric body 53 above the partition wall 25*c*. The upper surface of the piezoelectric body 53 is a surface located closer to the common electrode 52 in the z-axis direction.

The common electrode 52 is disposed above the piezoelectric body 53. The position of the upper surface of the common electrode 52 is constant in the z-axis direction. For example, the position of the upper surface of the common electrode 52 above the individual electrode 51 is substantially the same as the position of the upper surface of the common electrode 52 above the partition wall 25*c*. The upper surface of the common electrode 52 is a surface located closer to the VBS line 55 in the z-axis direction, and a lower surface of the common electrode 52 is a surface located closer to the piezoelectric body 53.

The VBS line 55 is disposed above the common electrode 52. The position of the upper surface of the VBS line 55 is constant in the z-axis direction. For example, the position of the upper surface of the VBS line 55 above the individual electrode 51 is substantially the same as the position of the upper surface of the VBS line 55 above the partition wall 25*c*. The upper surface of the VBS line 55 is a surface located closer to the sealed space in the z-axis direction, and a lower surface of the VBS line 55 is a surface located closer to the common electrode 52.

The thickness of the sealing plate 27 is constant above the piezoelectric elements 50. The position of the lower surface

27*c* of the sealing plate 27 is constant in the z-axis direction above the piezoelectric elements 50. As mentioned earlier, the sealing plate 27 is not provided with the protruding portions 27*g*.

The liquid ejecting head 10E includes the wiring portion 72E and the wiring portions 73E. The wiring portion 73E is provided between the VBS line 55 and the wiring portion 72E and electrically couples the VBS line 55 to the wiring portion 72E. The "wiring portion 72E" represents an example of the "second wiring portion" and the "wiring portion 73E" represents an example of the "third wiring portion". The wiring portion 72E is provided at the lower surface 27*c* of the sealing plate 27. The wiring portion 72E extends in the y-axis direction along the lower surface 27*c* of the sealing plate 27.

The wiring portion 73E electrically couples the wiring portion 72E to the VBS line 55 in the z-axis direction. The wiring portion 73E is located above the partition wall 25*c*. A length in the x-axis direction of the wiring portion 72E may be substantially equal to a length in the x-axis direction of the common electrode 52, for example. The wiring portion 73E may be a block body.

The above-described liquid ejecting head 10E according to the Embodiment 5 also has the same operation and effects as those of the liquid ejecting head 10 according to the Embodiment 1. The liquid ejecting head 10E may have a configuration that includes the sealing plate 27 not provided with the protruding portions 27*g*. Since the piezoelectric body 53 is present below the wiring portion 73E, it is possible to dispose the VBS line 55 at a position located away from the pressure chamber substrate 25, and thus to reduce the length in the x-axis direction of the wiring portion 73E. Thus, an increase in wiring resistance is avoided. Since the common electrode 52 and the VBS line 55 are linearly formed when viewed in the x-axis direction, it is possible to reduce the lengths of the common electrode 52 and the VBS line 55. Thus, the increase in wiring resistance is avoided.

Embodiment 6

Figure 12:
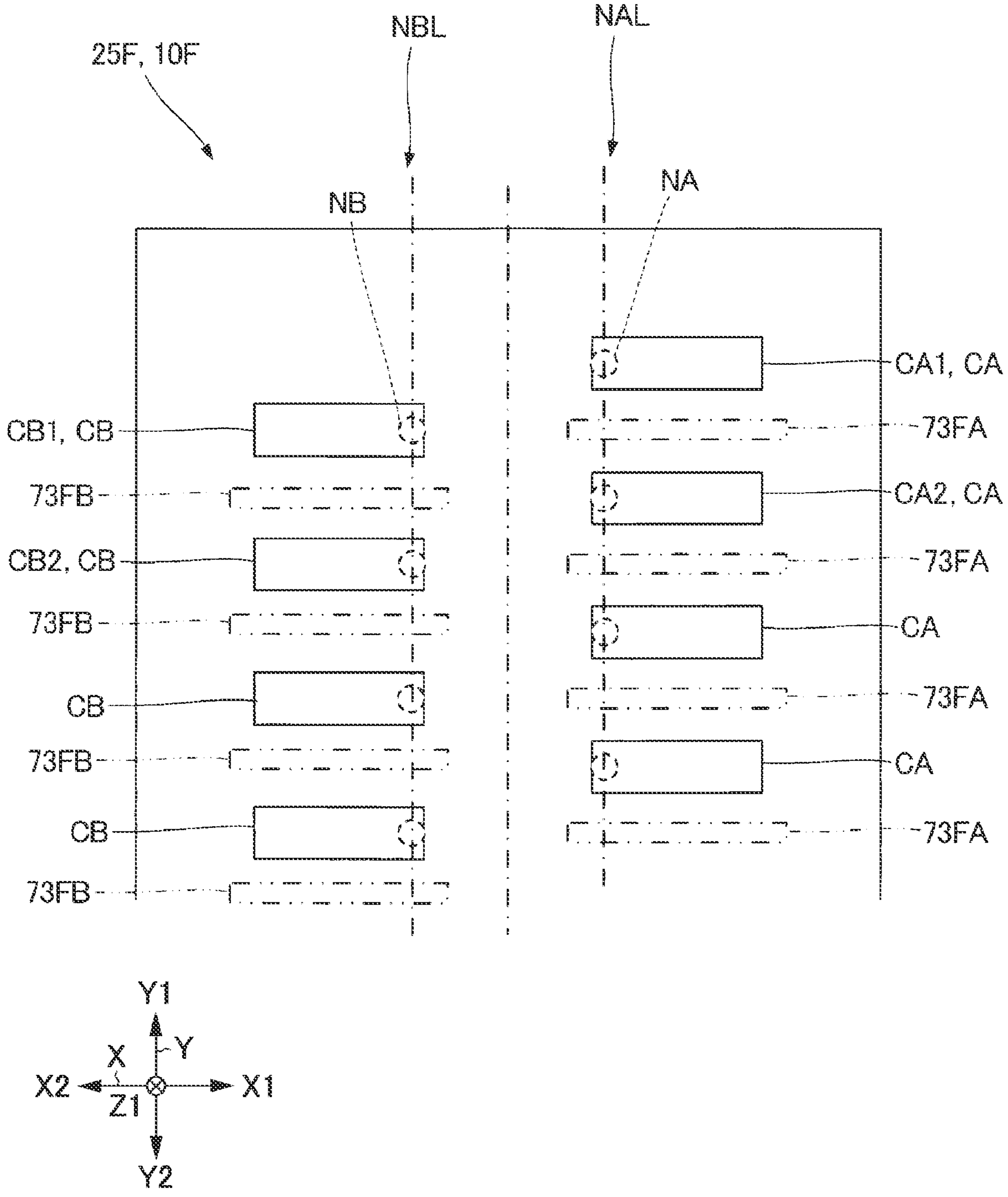
FIG. 12 is a plan view illustrating part of a pressure chamber substrate of a liquid ejecting head according to Embodiment 6.

Next, a liquid ejecting head 10F according to Embodiment 6 will be described. FIG. 12 is a plan view illustrating a pressure chamber substrate 25F of the liquid ejecting head 10F according to the Embodiment 6. The liquid ejecting head 10F according to the Embodiment 6 is different from the liquid ejecting head 10 according to the Embodiment 1 in that the liquid ejecting head 10F includes lines of nozzles NAL and NBL, includes the pressure chamber substrate 25F instead of the pressure chamber substrate 25, and includes wiring portions 73FA and 73FB disposed at positions different from one another in the y-axis direction. In the description of the Embodiment 6, the same explanations as those in the Embodiments 1 to 5 may be omitted as appropriate.

The liquid ejecting head 10F includes the pressure chamber substrate 25F. In FIG. 12, positions of nozzles NA and NB are indicated with dashed lines. Positions of the wiring portion 73FA and 73FB are indicated with chain double-dashed lines in FIG. 12. The pressure chamber substrate 25F is provided with the pressure chambers CA and CB. The pressure chambers CA and the pressure chambers CB are located away from one another in the x-axis direction. The pressure chambers CA arranged in the y-axis direction form the line of pressure chambers CAL. The pressure chambers CB arranged in the y-axis direction form the line of pressure chambers CBL.

The liquid ejecting head 10F includes lines of nozzles NAL and NBL. The line of nozzles NAL and the line of nozzles NBL are located away from each other in the x-axis direction. The line of nozzles NAL includes the nozzles NA arranged in the y-axis direction. The line of nozzles NBL includes the nozzles NB arranged in the y-axis direction. The nozzles NA and the nozzles NB are disposed at positions different from one another in the y-axis direction.

The line of pressure chambers CAL includes a pressure chamber CA1 and a pressure chamber CA2. The "pressure chamber CA1" represents an example of the "first pressure chamber". The "pressure chamber CA2" represents an example of the "second pressure chamber". Each pressure chamber CB is disposed between two pressure chambers CA when viewed in the x-axis direction. In other words, each pressure chamber CA is disposed between two pressure chambers CB when viewed in the x-axis direction. Each pressure chamber CA communicates with the corresponding nozzle NA. Each pressure chamber CB communicates with the corresponding nozzle NB. No pressure chambers CB communicate with the nozzles NA. No pressure chambers CA communicate with the nozzles NB.

The liquid ejecting head 10F includes the wiring portions 73FA and the wiring portions 73FB. Each wiring portion 73FA represents an example of the "third wiring portion". Each wiring portion 73FB represents another example of the "third wiring portion". Each wiring portion 73FA is disposed between two pressure chambers CA in the y-axis direction. Each wiring portion 73FB is disposed between two pressure chambers CB in the y-axis direction.

Each wiring portion 73FA is electrically coupled to the VBS line 55 that supplies a voltage to the common electrode 52 of the piezoelectric element 50A corresponding to the pressure chamber CA. The wiring portion 73FA is electrically coupled to the wiring portion 72 and the VBS line 55 on a line A side. The "line A side" includes the constituents concerning the pressure chambers CA.

Each wiring portion 73FB is electrically coupled to the VBS line 55 that supplies a voltage to the common electrode 52 of the piezoelectric element 50B corresponding to the pressure chamber CB. The wiring portion 73FB is electrically coupled to the wiring portion 72 and the VBS line 55 on a line B side. The "line B side" includes the constituents concerning the pressure chambers CB.

As described above, in the liquid ejecting head 10F, the pressure chambers CA on the line A side and the pressure chambers CB on the line B side are disposed at the positions different from one another in the y-axis direction. The pressure chambers CA and CB need not be disposed at the same positions in the y-axis direction. In the liquid ejecting head 10F, the wiring portions 73FA on the line A side and the wiring portions 73FB on the line B side are disposed at positions different from one another in the y-axis direction. The wiring portions 73FA and 73FB need not be disposed at the same positions in the y-axis direction.

Liquid Ejecting Apparatus

Figure 14:
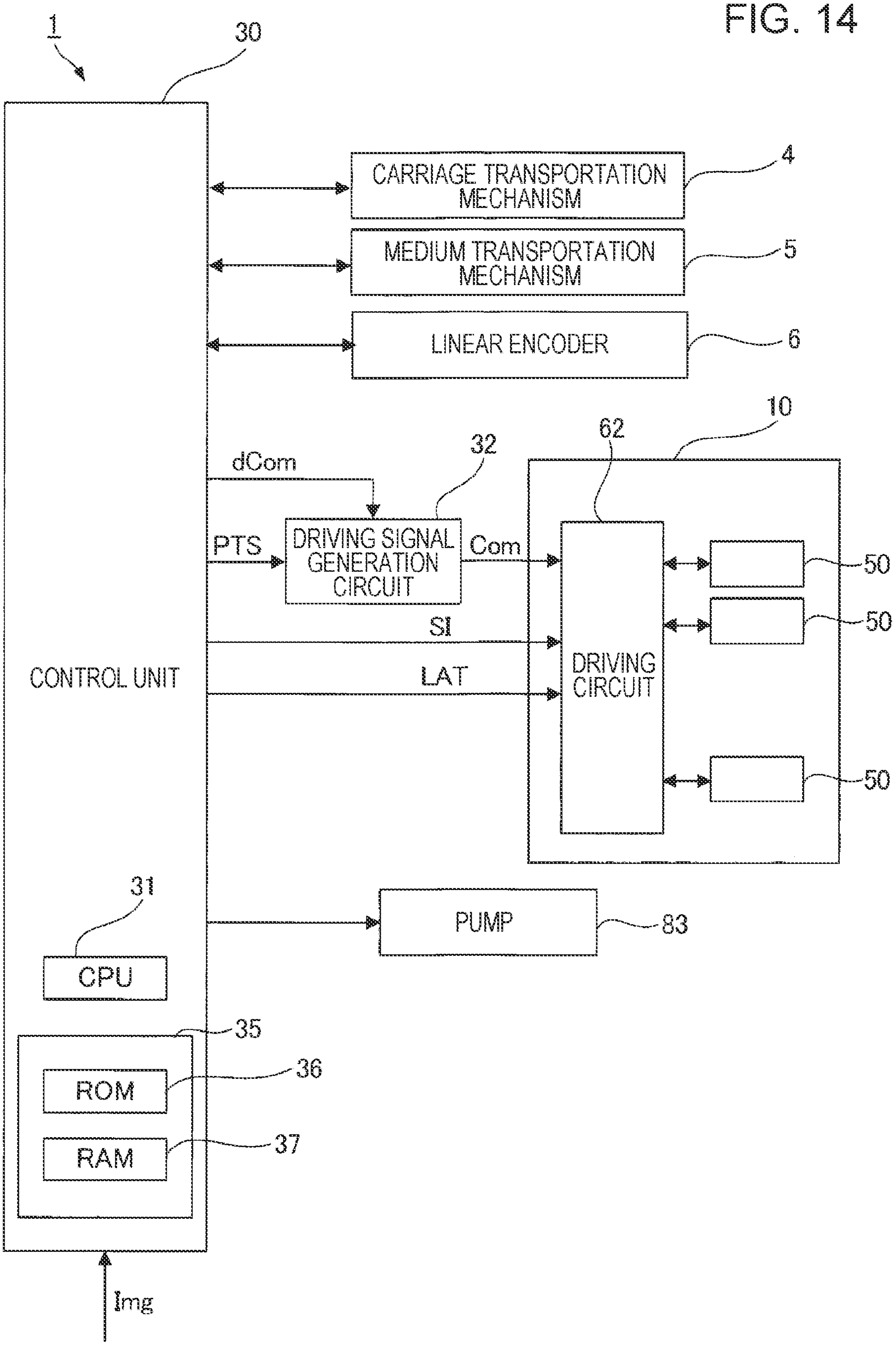
FIG. 14 is a block diagram illustrating the liquid ejecting apparatus according to the embodiment.

Next, a liquid ejecting apparatus 1 including the liquid ejecting head 10 will be described with reference to FIGS. 13 and 14. FIG. 13 is a schematic diagram illustrating the liquid ejecting apparatus 1 including the liquid ejecting head 10. The liquid ejecting apparatus 1 includes the liquid ejecting head 10 according to the above-described Embodiment 1. FIG. 14 is a block diagram illustrating the liquid ejecting apparatus 1. The liquid ejecting apparatus 1 is not limited to the structure that includes the liquid ejecting head 10 according to the Embodiment 1. The liquid ejecting apparatus 1 may include any of the liquid ejecting heads 10B to 10F according to the Embodiments 2 to 6 instead of the liquid ejecting head 10 according to the Embodiment 1.

The liquid ejecting apparatus 1 is an ink jet type printing apparatus that ejects an ink in the form of droplets, which represents an example of a "liquid", onto a medium PA. The liquid ejecting apparatus 1 is a serial type printing apparatus. The medium PA is typically a sheet of printing paper. The medium PA is not limited to the printing paper and may be a printing target of a desired material, such as a resin film and a cloth.

The liquid ejecting apparatus 1 includes the liquid ejecting head 10 that ejects inks, the liquid containers 2 that store inks, a carriage 3 on which the liquid ejecting head 10 is mounted, a carriage transportation mechanism 4 that transports the carriage 3, a medium transportation mechanism 5 that transports the medium PA, and the control unit 30. The control unit 30 is a control unit that controls ejection of the liquids.

Examples of specific aspects of the liquid container 2 include a cartridge attachable to and detachable from the liquid ejecting apparatus 1, an ink pack in the form of a bag formed from a flexible film, and an ink-refillable ink tank. Any type of the ink may be stored in the liquid container 2. The liquid ejecting apparatus 1 includes multiple liquid containers 2 corresponding to inks of four colors, for instance. Examples of the inks of four colors include cyan, magenta, yellow, and black inks. The liquid containers 2 may be mounted on the carriage 3.

The liquid ejecting apparatus 1 includes the circulation mechanism 8 that circulates the inks. The circulation mechanism 8 includes the supply flow channels 81 that supply the inks to the liquid ejecting head 10, the collection flow channels 82 that collect the inks discharged from the liquid ejecting head 10, and the pumps 83 that transfer the inks.

The carriage transportation mechanism 4 includes a transportation belt 4*a* for transporting the carriage 3, and a motor. The medium transportation mechanism 5 includes a transportation roller 5*a* and a motor for transporting the medium PA. The carriage transportation mechanism 4 and the medium transportation mechanism 5 are controlled by the control unit 30. The liquid ejecting apparatus 1 causes the carriage transportation mechanism 4 to transport the carriage 3 while causing the medium transportation mechanism 5 to transport the medium PA, and performs printing by ejecting the ink droplets onto the medium PA.

As illustrated in FIG. 14, the liquid ejecting apparatus 1 includes a linear encoder 6. The linear encoder 6 is provided at a position where it is possible to detect a position of the carriage 3. The linear encoder 6 obtains information concerning the position of the carriage 3. The linear encoder 6 outputs an encoder signal to the control unit 30 in response to a movement of the carriage 3.

The control unit 30 includes one or more CPUs 31. The control unit 30 may include an FPGA instead of or in addition to the CPUs 31. The control unit 30 includes a storage unit 35. The storage unit 35 includes a ROM 36 and a RAM 37, for example. The storage unit 35 may include an EEPROM or a PROM. The storage unit 35 can store print data Img supplied from a host computer. The storage unit 35 stores a control program for the liquid ejecting apparatus 1.

CPU stands for a central processing unit. FPGA stands for a field-programmable gate array. RAM stands for random access memory. ROM stands for read only memory. EEPROM stands for electrically erasable programmable read only memory. PROM stands for a programmable ROM.

The control unit 30 generates signals for controlling operations of the respective units in the liquid ejecting apparatus 1. The control unit 30 can generate a print signal SI and a waveform designation signal dCom. The print signal SI is a digital signal for defining a type of an operation of the liquid ejecting head 10. The print signal SI can designate whether or not to supply the driving signal Com to each piezoelectric element 50. The waveform designation signal dCom is a digital signal that defines a waveform of the driving signal Com. The driving signal Com is an analog signal for driving the piezoelectric element 50.

The liquid ejecting apparatus 1 includes the driving signal generation circuit 32. The driving signal generation circuit 32 is electrically coupled to the control unit 30. The driving signal generation circuit 32 includes a DA converter circuit. The driving signal generation circuit 32 generates the driving signal Com having the waveform defined by the waveform designation signal dCom. When the control unit 30 receives the encoder signal from the linear encoder 6, the control unit 30 outputs a timing signal PTS to the driving signal generation circuit 32. The timing signal PTS defines timing to generate the driving signal Com. The driving signal generation circuit 32 outputs the driving signal Com every time the driving signal generation circuit 32 receives the timing signal PTS.

The driving circuit 62 is electrically coupled to the control unit 30 and to the driving signal generation circuit 32. The driving circuit 62 switches, based on the print signal SI, whether or not to supply the driving signal Com to the piezoelectric element 50. The driving circuit 62 can select the piezoelectric element 50, to which the driving signal Com is supplied, based on the print signal SI, a latch signal LAT, and a change signal CH that are supplied from the control unit 30. The latch signal LAT defines timing to latch the print data Img. The change signal CH defines timing to select a driving pulse included in the driving signal Com.

The control unit 30 controls an ink ejection operation by the liquid ejecting head 10. As described above, the control unit 30 drives the piezoelectric element 50 to change the pressure of the ink inside the pressure chamber C, thereby ejecting the ink from the nozzle N. The control unit 30 controls the ejection operation when performing a printing operation.

The above-described liquid ejecting head 10 can be applied to the liquid ejecting apparatus 1. The liquid ejecting apparatus 1 including the liquid ejecting head 10 can reduce the wiring resistance in the VBS line 55 since the wiring portions 72 and 73 are provided therein. The liquid ejecting apparatus 1 suppresses the delay of the current to the common electrode 52. Since the protruding portion 27*g* of the sealing plate 27 and the wiring portion 73 are provided above the partition wall 25*c*, the partition wall 25*c* is pressed from above and kept from deformation. Thus, the deflection of the partition wall 25*c* is suppressed.

Modified Example 1

In the above-described liquid ejecting head 10 according to the Embodiment 1, the protruding portion 27*g* of the sealing plate 27 is designed to protrude downward. Instead, the piezoelectric body 53 may be disposed above the partition wall 25*c*, and the piezoelectric body 53 above the partition wall 25*c* may be designed to protrude upward. In this way, the common electrode 52 and the VBS line 55 above the partition wall 25*c* are located at positions close to the sealing plate 27. Alternatively, the protruding portion 27*g* of the sealing plate 27 may be designed to protrude downward and the piezoelectric body 53 above the partition wall 25*c* may be designed to protrude upward.

The above-described Embodiments merely demonstrate representative examples of the present disclosure. The present disclosure is not limited to the above-described Embodiments, and various modifications and additions are possible within the range not departing from the gist of the present disclosure.

The above-described Embodiment 1 shows the example of the liquid ejecting head 10 configured to circulate the liquid. However, the present disclosure is also applicable to a liquid ejecting head 10 not configured to circulate the liquid.

The above-described Embodiment 1 exemplifies the case where two pressure chambers in total, namely, one first pressure chamber CA and one second pressure chamber CB communicate with one nozzle N. Instead, four pressure chambers in total, namely, two first pressure chambers CA adjacent to each other in the y-axis direction and two second pressure chambers CB adjacent to each other in the y-axis direction may communicate with one nozzle N.

The above-described Embodiments shows the example of the serial type liquid ejecting apparatus that reciprocates the carriage, on which the liquid ejecting head 10 is mounted, in the width direction of the medium PA. Instead, the present disclosure is also applicable to a line type liquid ejecting apparatus 1 provided with a line head on which multiple liquid ejecting heads 10 are mounted.

The liquid ejecting apparatus 1 shown as the example in any of the above-described Embodiments can be adopted to various apparatuses, such as a facsimile apparatus and a copier in addition to the apparatus dedicated for printing. The use of the liquid ejecting apparatus of the present disclosure is not limited to the printing. For example, a liquid ejecting apparatus configured to eject a solution of a coloring material is used as a manufacturing apparatus for forming color filters of display devices, such as liquid crystal display panels. A liquid ejecting apparatus configured to eject a solution of a conductive material is used as a manufacturing apparatus for forming wiring and electrodes on wiring boards. A liquid ejecting apparatus configured to eject a solution of a biological organic substance is used as a manufacturing apparatus for manufacturing biochips, for example.

What is claimed is:

1. A liquid ejecting head comprising:
- a nozzle substrate including
  - a first nozzle configured to eject a liquid and
  - a second nozzle provided at a position adjacent to the first nozzle and configured to eject a liquid;
- a pressure chamber substrate provided above the nozzle substrate and including
  - a first pressure chamber that communicates with the first nozzle and
  - a second pressure chamber that communicates with the second nozzle;
- a first piezoelectric element formed from a common electrode, a first piezoelectric body, and a first individual electrode and configured to apply a pressure to a liquid in the first pressure chamber;
- a second piezoelectric element formed from the common electrode, a second piezoelectric body, and a second individual electrode and configured to apply a pressure to a liquid in the second pressure chamber;
- a sealing substrate provided above the pressure chamber substrate in such a way as to cover the first piezoelectric element and the second piezoelectric element;

a wiring board configured to apply a voltage to the common electrode, the first individual electrode, and the second individual electrode;

a first wiring portion provided above the pressure chamber substrate and configured to electrically couple the common electrode to the wiring board;

a second wiring portion provided at a lower surface of the sealing substrate and configured to electrically couple the common electrode to the wiring board; and a third wiring portion provided between the first piezoelectric element and the second piezoelectric element and configured to electrically couple the first wiring portion to the second wiring portion.

2. The liquid ejecting head according to claim 1, wherein the nozzle substrate further includes a third nozzle provided at a position adjacent to the second nozzle and configured to eject a liquid, the pressure chamber substrate further includes a third pressure chamber that communicates with the third nozzle, the liquid ejecting head further includes a third piezoelectric element formed from the common electrode, a third piezoelectric body, and a third individual electrode and configured to apply a pressure to a liquid in the third pressure chamber, and a fourth wiring portion provided between the second piezoelectric element and the third piezoelectric element and configured to electrically couple the first wiring portion to the second wiring portion.

3. The liquid ejecting head according to claim 1, wherein the nozzle substrate further includes a third nozzle provided at a position adjacent to the second nozzle and configured to eject a liquid, the pressure chamber substrate further includes a third pressure chamber that communicates with the third nozzle, and the liquid ejecting head further includes a third piezoelectric element formed from the common electrode, a third piezoelectric body, and a third individual electrode and configured to apply a pressure to a liquid in the third pressure chamber, and a wiring portion configured to electrically couple the first wiring portion to the second wiring portion is not provided between the second piezoelectric element and the third piezoelectric element.

4. The liquid ejecting head according to claim 1, wherein a thickness of the second wiring portion is larger than a thickness of the first wiring portion.

5. The liquid ejecting head according to claim 1, wherein a thickness of the third wiring portion is larger than thicknesses of the first wiring portion and the second wiring portion.

6. The liquid ejecting head according to claim 1, wherein a thickness of a portion of the sealing substrate provided with the third wiring portion is larger than a thickness of a portion of the sealing substrate not provided with the third wiring portion.

7. The liquid ejecting head according to claim 1, wherein the sealing substrate includes a protruding portion that protrudes toward the pressure chamber substrate, and the third wiring portion is provided corresponding to the protruding portion.

8. The liquid ejecting head according to claim 7, wherein the protruding portion includes an inclined surface inclined relative to an upper surface of the pressure chamber substrate, and a portion of the second wiring portion located close to the third wiring portion is disposed along the inclined surface.

9. The liquid ejecting head according to claim 7, wherein the protruding portion is disposed at a position overlapping a partition wall that defines the first pressure chamber and the second pressure chamber when viewed in a thickness direction of the pressure chamber substrate.

10. The liquid ejecting head according to claim 1, wherein, in a direction in which the first pressure chamber and the second pressure chamber are next to each other, a width of the third wiring portion is smaller than a width of a partition wall between the first pressure chamber and the second pressure chamber.

11. The liquid ejecting head according to claim 1, wherein the common electrode is provided above the first piezoelectric body and the second piezoelectric body, and the first wiring portion is provided at an upper surface of the common electrode.

12. The liquid ejecting head according to claim 1, wherein the first wiring portion, the second wiring portion, and the third wiring portion are formed from an identical material.

13. The liquid ejecting head according to claim 1, wherein the first nozzle and the second nozzle are two nozzles adjacent to each other among nozzles constituting a line of nozzles communicating with a single common liquid chamber.

14. A liquid ejecting apparatus comprising:

the liquid ejecting head according to claim 1; and a control unit that controls an operation of ejection from the liquid ejecting head.

* * * * *